(12) United States Patent
Wei et al.

(10) Patent No.: US 10,972,328 B2
(45) Date of Patent: Apr. 6, 2021

(54) DEMODULATION REFERENCE SIGNAL AND PHASE ROTATION FOR SUB-PHYSICAL RESOURCE BLOCK ALLOCATION WITH TWO TONE MODULATION

(71) Applicant: QUALCOMM Incorporated, San Diego, CA (US)

(72) Inventors: Chao Wei, Beijing (CN); Xiao Feng Wang, San Diego, CA (US); Alberto Rico Alvarino, San Diego, CA (US); Le Liu, Fremont, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 16/224,227

(22) Filed: Dec. 18, 2018

(65) Prior Publication Data

US 2019/0222457 A1    Jul. 18, 2019

Related U.S. Application Data

(63) Continuation of application No. PCT/CN2018/072968, filed on Jan. 17, 2018.

(51) Int. Cl.
*H04L 27/26* (2006.01)
*H04W 72/04* (2009.01)
(Continued)

(52) U.S. Cl.
CPC .......... *H04L 27/2649* (2013.01); *H04L 5/003* (2013.01); *H04L 5/0051* (2013.01);
(Continued)

(58) Field of Classification Search
None
See application file for complete search history.

(56) References Cited

U.S. PATENT DOCUMENTS 6,175,316 B1 * 1/2001 Barsoum ................. H03M 5/10
341/54
7,302,014 B1 * 11/2007 Barsoum ............. H04L 27/2657
375/326
(Continued)

FOREIGN PATENT DOCUMENTS

CN        106954261 A    7/2017
WO     2016137584 A1    9/2016
(Continued)

OTHER PUBLICATIONS

U.S. Appl. No. 62/617,878 supporting subject matter of US20190222447 (Year: 2018).*
(Continued)

*Primary Examiner* — Andre Tacdiran
(74) *Attorney, Agent, or Firm* — Harrity & Harrity, LLP

(57) ABSTRACT

Methods, apparatuses, and computer program products for wireless communication are provided. A user equipment (UE) may be configured to determine a phase rotation for a symbol based at least in part on a tone index. The UE may be configured to apply the phase rotation to the received symbol, and transmit the uplink symbol. Numerous other aspects are provided.

30 Claims, 18 Drawing Sheets

(51) Int. Cl.
*H04L 5/00* (2006.01)
*H04L 27/18* (2006.01)
*H04B 7/0456* (2017.01)

(52) U.S. Cl.
CPC .......... *H04L 27/18* (2013.01); *H04L 27/2607* (2013.01); *H04L 27/2613* (2013.01); *H04L 27/2614* (2013.01); *H04W 72/0446* (2013.01); *H04B 7/0456* (2013.01); *H04L 5/0007* (2013.01)

(56) References Cited

U.S. PATENT DOCUMENTS

| | | | |
|---|---|---|---|
| 9,949,263 B2 | 4/2018 | Li et al. | |
| 2003/0152050 A1* | 8/2003 | Mochizuki | H04L 27/2647 370/332 |
| 2008/0037686 A1* | 2/2008 | Akita | H04L 5/0048 375/302 |
| 2008/0262775 A1* | 10/2008 | Mikkonen | H04L 5/0048 702/106 |
| 2011/0142003 A1* | 6/2011 | Kuchi | H04B 7/0617 370/330 |
| 2012/0127929 A1* | 5/2012 | Silverman | H04L 27/2607 370/329 |
| 2016/0286012 A1* | 9/2016 | Yu | H04L 25/03343 |
| 2017/0201403 A1 | 7/2017 | Johansson et al. | |
| 2017/0318574 A1* | 11/2017 | Choi | H04W 72/0413 |
| 2019/0036746 A1* | 1/2019 | Hwang | H04L 27/22 |
| 2019/0052495 A1* | 2/2019 | Kim | H04L 27/36 |
| 2019/0081722 A1* | 3/2019 | Takeda | H04W 72/04 |
| 2019/0149381 A1* | 5/2019 | Vos | H04L 5/0053 370/329 |
| 2019/0222447 A1* | 7/2019 | Vos | H04L 27/206 |
| 2019/0229962 A1* | 7/2019 | Peng | H04L 5/0007 |
| 2019/0349164 A1* | 11/2019 | Ge | H04L 5/0007 |
| 2019/0393982 A1* | 12/2019 | Chen | H04L 27/22 |
| 2020/0154461 A1* | 5/2020 | Bahng | H04L 5/001 |

FOREIGN PATENT DOCUMENTS

| | | |
|---|---|---|
| WO | 2017119720 A2 | 7/2017 |
| WO | 2017135693 A1 | 8/2017 |

OTHER PUBLICATIONS

Partial International Search Report—PCT/US2019/013057—ISA/EPO—dated Mar. 19, 2019.

Sierra Wireless: "Sub-PRB Design Analysis", 3GPP Draft, R1-1720155 UL SPEC EFF V1, 3rd Generation Partnership Project (3GPP), Mobile Competence Centre, 650, Route Des Lucioles, F-06921 Sophia-Antipolis Cedex, France, vol. RAN WG1, No. Reno. USA, Nov. 27, 2017-Dec. 1, 2017, Nov. 18, 2017 (Nov. 18, 2017), XP051369792, 10 Pages, Retrieved from the Internet: URL:http://www.3gpp.org/ftp/tsg%5Fran/WG1%5FRL1/TSGR1%5F91/Docs/ [retrieved on Nov. 18, 2017].

International Search Report and Written Opinion—PCT/US2019/013057—ISA/EPO—dated Apr. 24, 2019.

International Search Report and Written Opinion—PCT/CN2018/072968—ISA/EPO—dated Oct. 29, 2018.

\* cited by examiner

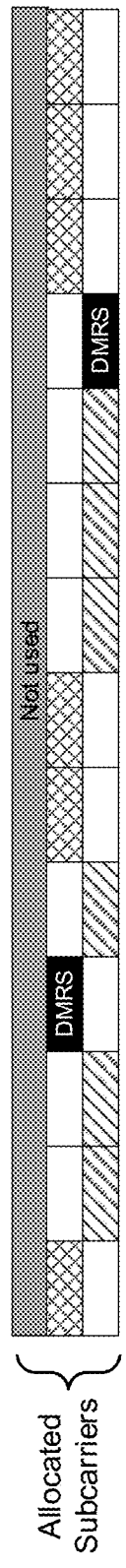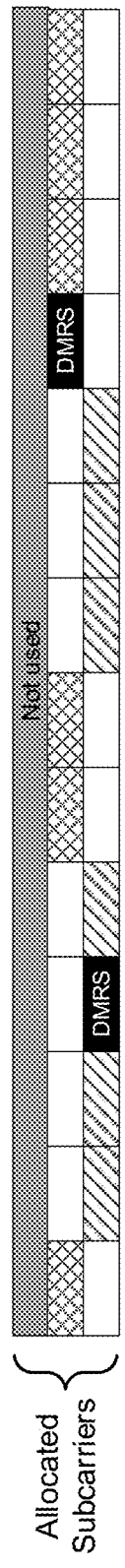
FIG. 5B
FIG. 5C

DEMODULATION REFERENCE SIGNAL AND PHASE ROTATION FOR SUB-PHYSICAL RESOURCE BLOCK ALLOCATION WITH TWO TONE MODULATION

CROSS-REFERENCE TO RELATED APPLICATION

This application claims priority to Patent Cooperation Treaty Application No. PCT/CN2018/072968, filed on Jan. 17, 2018, entitled "TECHNIQUES AND APPARATUSES FOR DEMODULATION REFERENCE SIGNAL AND PHASE ROTATION FOR SUB-PHYSICAL RESOURCE BLOCK ALLOCATION WITH TWO TONE MODULATION," which is hereby expressly incorporated by reference herein.

BACKGROUND

Field

Aspects of the present disclosure generally relate to wireless communication, and more particularly to techniques and apparatuses for demodulation reference signal (DMRS) and phase rotation for sub physical resource block (sub-PRB) allocation with two tone modulation.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

Generally, a minimum resource allocation granularity for an uplink communication (e.g., a physical uplink shared channel (PUSCH) communication transmitted by an enhanced machine-type communication (eMTC) UE) is one PRB. However, allocations at such a minimum granularity may be inefficient (e.g., since a UE is power limited even with a one PRB allocation in, for example, a deep coverage scenario). Thus, reducing the minimum granularity of a resource allocation to be less than one PRB may improve uplink spectrum efficiency by allowing additional UEs to be multiplexed in the PRBs (using frequency division multiplexing). One technique for supporting resource allocations at the sub-PRB granularity (e.g., for eMTC UEs) is to implement resource allocations of three subcarriers (e.g., three adjacent subcarriers) with SC-FDMA $\pi/2$ binary phase shift keying (BPSK) modulation, where only two of the three subcarriers are used by a UE for transmitting an uplink communication. This technique has the benefit of providing a relatively low peak to average power ratio (PAPR) since, with DFT spreading of length two, this causes the UE to transmit using a single tone (i.e., a single allocated subcarrier). However, when generating and transmitting a demodulation reference signal (DMRS) associated with such a transmission of uplink data, a one-tone DMRS (i.e., a DMRS that uses a single subcarrier) may be desirable in order to, for example, keep a PAPR, associated with the DMRS, reasonably close to the PAPR associated with the data transmission.

Further, when a receiver receives symbols associated with a one-tone uplink communication (e.g., a symbol associated with a one-tone DMRS, a symbol associated with uplink data transmitted in one tone based at least in part on a two modulation scheme), the receiver needs to compensate for a phase jump between an end of a previous symbol and a start of a next symbol. Notably, the phase rotation is applied consecutively over each symbol, and the phase rotation at a given symbol is dependent on phase rotations of all previous symbols. In other words, the phase rotation is accumulated over the symbols. For two-tone modulation using SC-FDMA $\pi/2$ BPSK, the tone index of a given symbol can differ from the tone index of a previous symbol (e.g., since a subcarrier used for a given symbol can differ from that used for a next symbol). Thus, a phase rotation determined based on a tone index of the tone that is actually used for the one-tone communication may allow phase continuity to be maintained, but this may be unfeasible and/or undesirable for the receiver in practice. For example, since a phase rotation for a given symbol depends on the phase rotation for all the previous symbols, the receiver would need to hypoth-

SUMMARY

Some techniques and apparatuses, described herein, provide for generation of a one-tone DMRS based at least in part on one or more sequences. The one-tone DMRS may be generated and transmitted by a UE when the UE is allocated resources at a sub-PRB granularity and uses two tone modulation, as described herein. In some aspects, the one-tone DMRS may be generated based at least in part on a first sequence (e.g., a linear cyclic code, a Hadamard code, a Gold sequence, one of a plurality of complex orthogonal sequences, and/or the like) and a second sequence (e.g., a Gold sequence, one of a plurality of binary orthogonal sequences, and/or the like). Additionally, or alternatively, the one-tone DMRS may be generated based at least in part on a single binary sequence. In some aspects, the one-tone DMRS may be transmitted in a single tone associated with the sub-PRB resource allocation.

Some techniques and apparatuses, described herein, provide for determination of a phase rotation for a symbol, associated with a one-tone uplink communication, based at least in part on a tone index. The phase rotation may be determined and applied by a wireless communication device (e.g., a base station, a UE) when the uplink communication uses resources allocated at a sub-PRB granularity and uses two tone modulation, as described herein. In some aspects, the phase rotation may be determined based at least in part on a reference tone index. In some aspects, the reference tone index may correspond to a particular tone associated with the resource allocation, or may be based at least in part on two tones associated with the resource allocation (e.g., a midpoint associated with the two tones). In some aspects, the phase rotation may be applied to the symbol in order to compensate for a phase jump.

In an aspect of the disclosure, a method, a user equipment (UE), a base station, an apparatus, and a computer program product are provided.

In some aspects, the method may by performed by a UE. The method may include generating, by the UE, a one-tone demodulation reference signal based at least in part on one or more sequences, wherein the UE is to transmit the one-tone demodulation reference signal based at least in part on a resource allocation at sub physical resource block granularity and a two-tone modulation scheme; and transmitting, by the UE, the one-tone demodulation reference signal using a single tone associated with the resource allocation.

In some aspects, the UE may include a memory and one or more processors operatively coupled to the memory. The memory and the one or more processors may be configured to generate a one-tone demodulation reference signal based at least in part on one or more sequences, wherein the UE is to transmit the one-tone demodulation reference signal based at least in part on a resource allocation at sub physical resource block granularity and a two-tone modulation scheme; and transmit the one-tone demodulation reference signal using a single tone associated with the resource allocation.

In some aspects, the apparatus may include means for generating a one-tone demodulation reference signal based at least in part on one or more sequences, wherein the apparatus is to transmit the one-tone demodulation reference signal based at least in part on a resource allocation at sub physical resource block granularity and a two-tone modulation scheme; and means for transmitting the one-tone demodulation reference signal using a single tone associated with the resource allocation.

In some aspects, the computer program product may include a non-transitory computer-readable medium storing one or more instructions. The one or more instructions, when executed by one or more processors of a UE, may cause the one or more processors to generate a one-tone demodulation reference signal based at least in part on one or more sequences, wherein the UE is to transmit the one-tone demodulation reference signal based at least in part on a resource allocation at sub physical resource block granularity and a two-tone modulation scheme; and transmit the one-tone demodulation reference signal using a single tone associated with the resource allocation.

In some aspects, the method may by performed by a base station. The method may include determining, by a base station, a phase rotation for a symbol associated with an uplink communication, wherein the uplink communication uses a two-tone modulation scheme and is associated with a resource allocation at sub physical resource block granularity, and wherein the phase rotation is determined based at least in part on a tone index associated with the resource allocation; and applying, by the base station, the phase rotation to the symbol.

In some aspects, the base station may include a memory and one or more processors operatively coupled to the memory. The memory and the one or more processors may be configured to determine a phase rotation for a symbol associated with an uplink communication, wherein the uplink communication uses a two-tone modulation scheme and is associated with a resource allocation at sub physical resource block granularity, and wherein the phase rotation is determined based at least in part on a tone index associated with the resource allocation; and apply the phase rotation to the symbol.

In some aspects, the apparatus may include means for determining a phase rotation for a symbol associated with an uplink communication, wherein the uplink communication uses a two-tone modulation scheme and is associated with a resource allocation at sub physical resource block granularity, and wherein the phase rotation is determined based at least in part on a tone index associated with the resource allocation; and means for applying the phase rotation to the symbol.

In some aspects, the computer program product may include a non-transitory computer-readable medium storing one or more instructions. The one or more instructions, when executed by one or more processors of a base station, may cause the one or more processors to determine a phase rotation for a symbol associated with an uplink communication, wherein the uplink communication uses a two-tone modulation scheme and is associated with a resource allocation at sub physical resource block granularity, and wherein the phase rotation is determined based at least in part on a tone index associated with the resource allocation; and apply the phase rotation to the symbol.

In some aspects, the method may by performed by a UE. The method may include determining, by a UE, a phase rotation for a symbol associated with an uplink communication, wherein the uplink communication is to use a two-tone modulation scheme and is associated with a resource allocation at sub physical resource block granularity, and wherein the phase rotation is determined based at least in part on a tone index associated with the resource allocation; and applying, by the UE, the phase rotation to the symbol.

In some aspects, the wireless communication device may include a memory and one or more processors operatively coupled to the memory. The memory and the one or more processors may be configured to determine phase rotation for a symbol associated with an uplink communication, wherein the uplink communication is to use a two-tone modulation scheme and is associated with a resource allocation at sub physical resource block granularity, and wherein the phase rotation is determined based at least in part on a tone index associated with the resource allocation; and apply the phase rotation to the symbol.

In some aspects, the apparatus may include means for determining a phase rotation for a symbol associated with an uplink communication, wherein the uplink communication is to use a two-tone modulation scheme and is associated with a resource allocation at sub physical resource block granularity, and wherein the phase rotation is determined based at least in part on a tone index associated with the resource allocation; and means for applying the phase rotation to the symbol.

In some aspects, the computer program product may include a non-transitory computer-readable medium storing one or more instructions. The one or more instructions, when executed by one or more processors of a UE, may cause the one or more processors to determine phase rotation for a symbol associated with an uplink communication, wherein the uplink communication is to use a two-tone modulation scheme and is associated with a resource allocation at sub physical resource block granularity, and wherein the phase rotation is determined based at least in part on a tone index associated with the resource allocation; and apply the phase rotation to the symbol.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

FIGS. 5A-5E are diagrams associated with an example of generating a one-tone DMRS for a sub-PRB allocation with two tone modulation.

DETAILED DESCRIPTION

Figure 1:
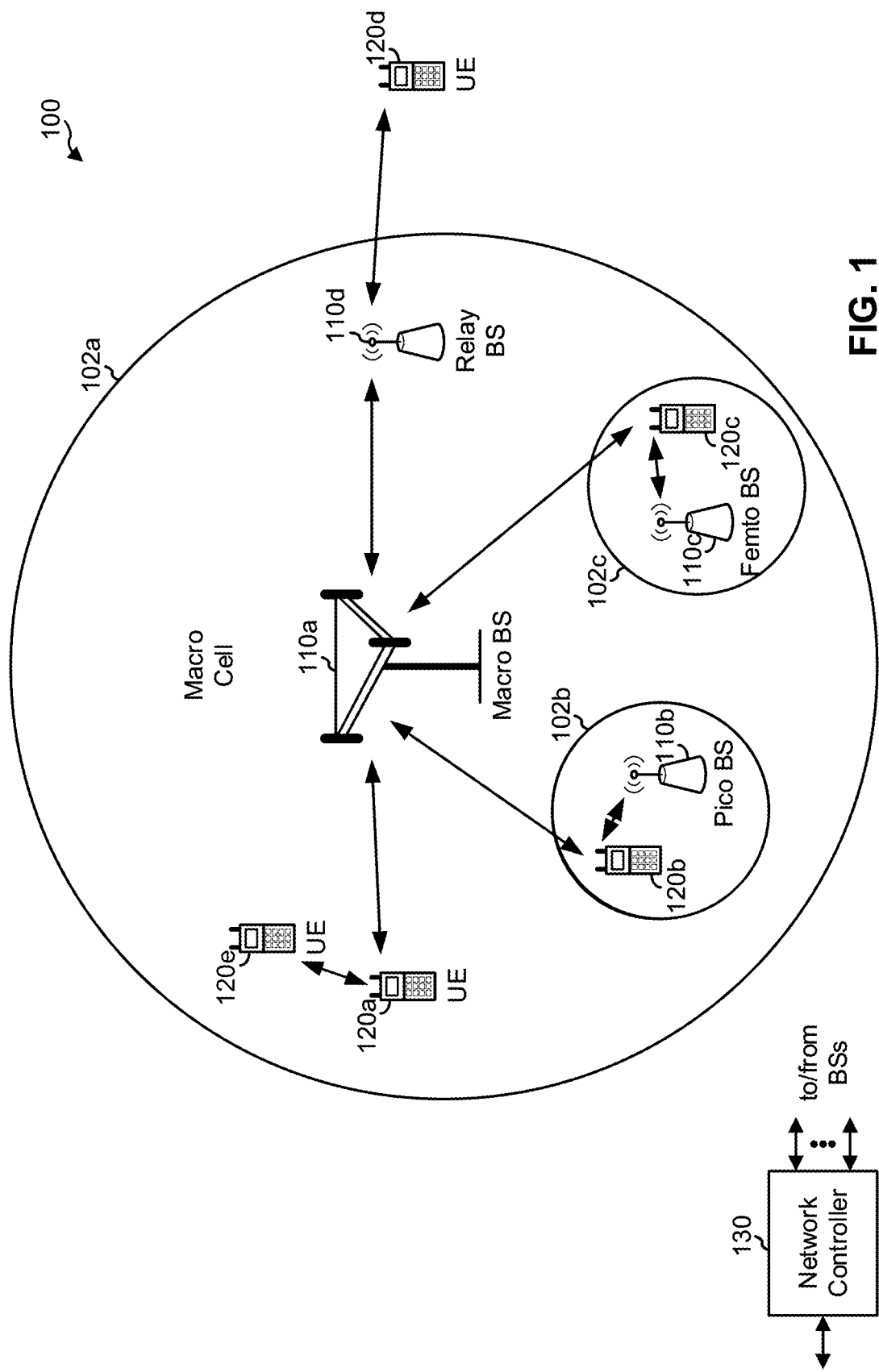
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without those specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with 3G and/or 4G wireless technologies, aspects of the present disclosure can be applied in other generation-based communication systems, such as 5G and subsequent related technologies.

FIG. 1 is a diagram illustrating a network 100 in which aspects of the present disclosure may be practiced. The network 100 may be an LTE network or some other wireless network, such as a 5G network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein. In some aspects, BS 110 may determine a phase rotation for a received symbol, associated with a one-tone uplink transmission, based at least in part on a tone index of a tone associated with the received symbol (e.g., when a UE that transmits the uplink communication is allocated resources at a sub-PRB granularity and uses two tone modulation), as described herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. In some aspects, a UE 120 may generate a one-tone DMRS (e.g., based at least in part on one or more sequences) and may transmit the one-tone DMRS in a single tone when the UE 120 is allocated resources at a sub-PRB granularity and uses two tone modulation, as described herein.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
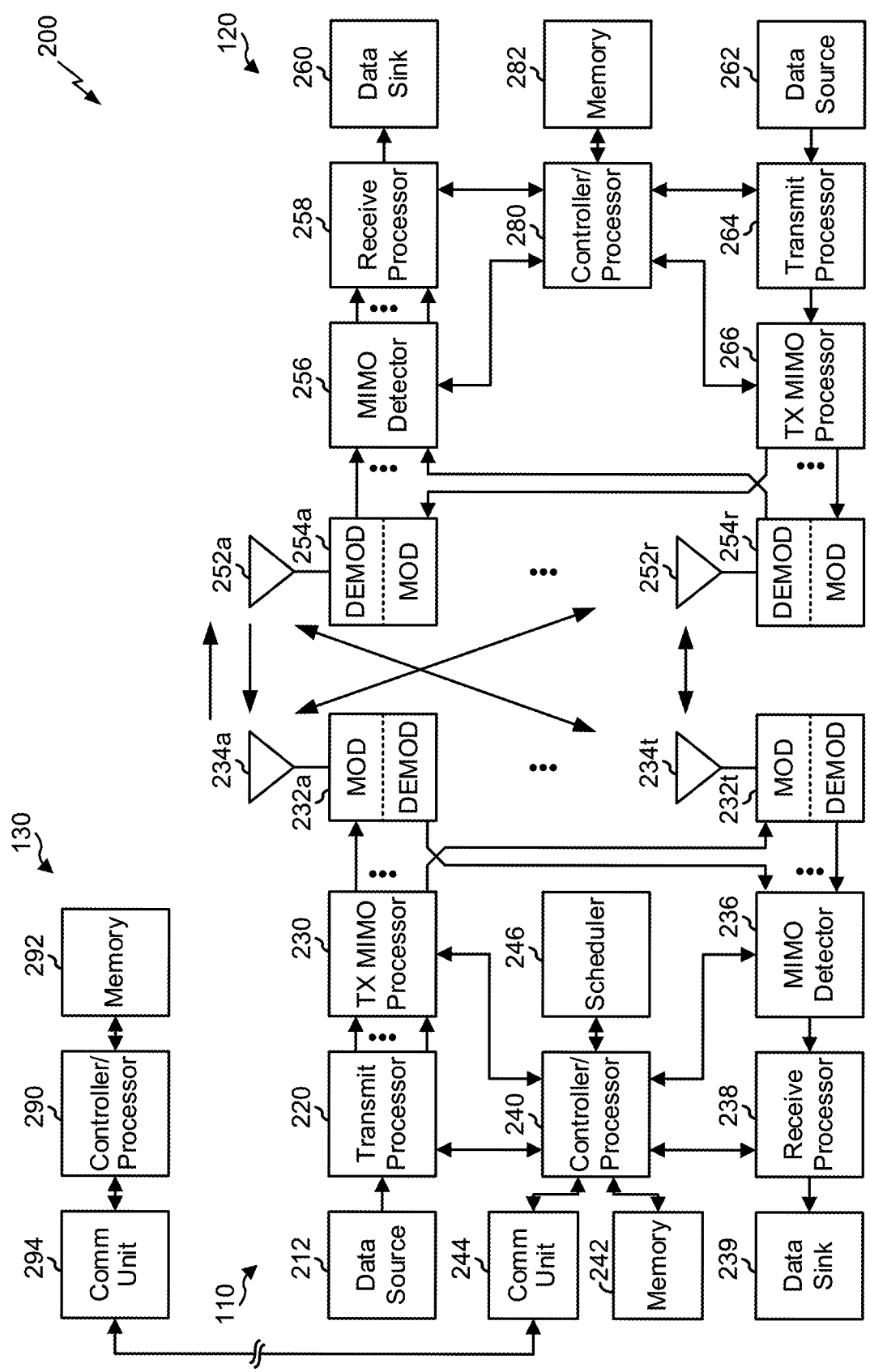
FIG. 2 is a diagram illustrating an example of a base station in communication with a user equipment (UE) in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals may be generated with location encoding to convey additional information. In some aspects, one or more of the above components of base station 110 may be configured to determine a phase rotation for a received symbol, associated with a one-tone uplink transmission, based at least in part on a tone index of a tone associated with the received symbol (e.g., when a UE 120 that transmits the uplink communication is allocated resources at a sub-PRB granularity and uses two tone modulation), as described herein.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, one or more of the above components of UE 120 may generate a one-tone DMRS (e.g., based at least in part on one or more sequences) and may transmit the one-tone DMRS in a single tone when the UE 120 is allocated resources at a sub-PRB granularity and uses two tone modulation, as described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with DMRS and phase rotation for sub-PRB allocation with two tone modulation, as described in more detail elsewhere herein. For example, controller/processor 240 of base station 110, controller/processor 280 of UE 120, and/or any other component(s) of FIG. 2 may perform or direct operations of, for example, method 600 of FIG. 6, method 1000 of FIG. 10 and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples may differ from what is described with regard to FIG. 2.

5G may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, 5G may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, 5G may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. 5G may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. 5G resource blocks may span 12 subcarriers with a subcarrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission, and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, 5G may support a different air interface, other than an OFDM-based interface. 5G networks may include entities such as central units or distributed units.

The RAN may include a central unit (CU) and distributed units (DUs). A 5G BS (e.g., gNB, 5G Node B, Node B, transmit receive point (TRP), access point (AP)) may correspond to one or multiple BSs. 5G cells may be configured as access cells (ACells) or data only cells (DCells). For example, the RAN (e.g., a central unit or distributed unit) may configure the cells. DCells may be cells used for carrier aggregation or dual connectivity, but not used for initial access, cell selection/reselection, or handover. In some aspects, DCells may not transmit synchronization signals. In some aspects, DCells may transmit synchronization signals. 5G BSs may transmit downlink signals to UEs indicating the cell type. Based at least in part on the cell type indication, the UE may communicate with the 5G BS. For example, the UE may determine 5G BSs to consider for cell selection, access, handover, and/or measurement based at least in part on the indicated cell type.

Figure 3:
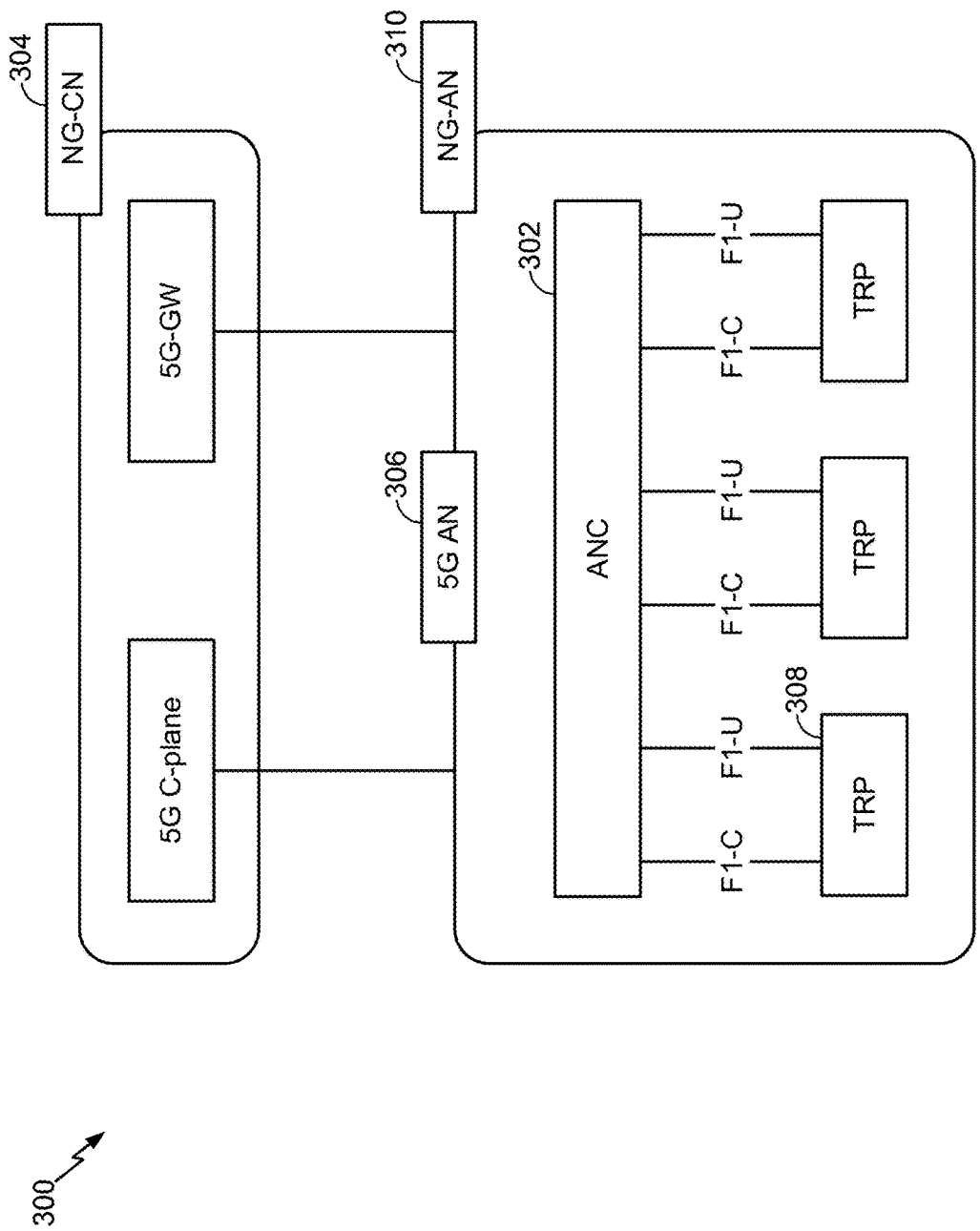
FIG. 3 is a diagram illustrating an example logical architecture of a distributed radio access network (RAN).

FIG. 3 illustrates an example logical architecture of a distributed RAN 300, according to aspects of the present disclosure. A 5G access node 306 may include an access node controller (ANC) 302. The ANC may be a central unit (CU) of the distributed RAN 300. The backhaul interface to the next generation core network (NG-CN) 304 may terminate at the ANC. The backhaul interface to neighboring next generation access nodes (NG-ANs) may terminate at the ANC. The ANC may include one or more TRPs 308 (which may also be referred to as BSs, 5G BSs, Node Bs, 5G NBs, APs, gNB, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE. In some aspects, a TRP 308 may determine a phase rotation for a received symbol, associated with a one-tone uplink transmission from a UE, based at least in part on a tone index of a tone associated with the received symbol (e.g., when the UE that transmits the uplink communication is allocated resources at a sub-PRB granularity and uses two tone modulation), as described herein. In some aspects, a UE may generate (e.g., based at least in part on one or more sequences) and provide, to a TRP 308, a one-tone DMRS (e.g., when the UE is allocated resources at a sub-PRB granularity and uses two tone modulation), as described herein.

The local architecture of RAN 300 may be used to illustrate fronthaul definition. The architecture may be defined to support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of RAN 300. The PDCP, RLC, MAC protocol may be adaptably placed at the ANC or TRP.

According to various aspects, a BS may include a central unit (CU) (e.g., ANC 302) and/or one or more distributed units (e.g., one or more TRPs 308).

As indicated above, FIG. 3 is provided merely as an example. Other examples may differ from what is described with regard to FIG. 3.

Figure 4:
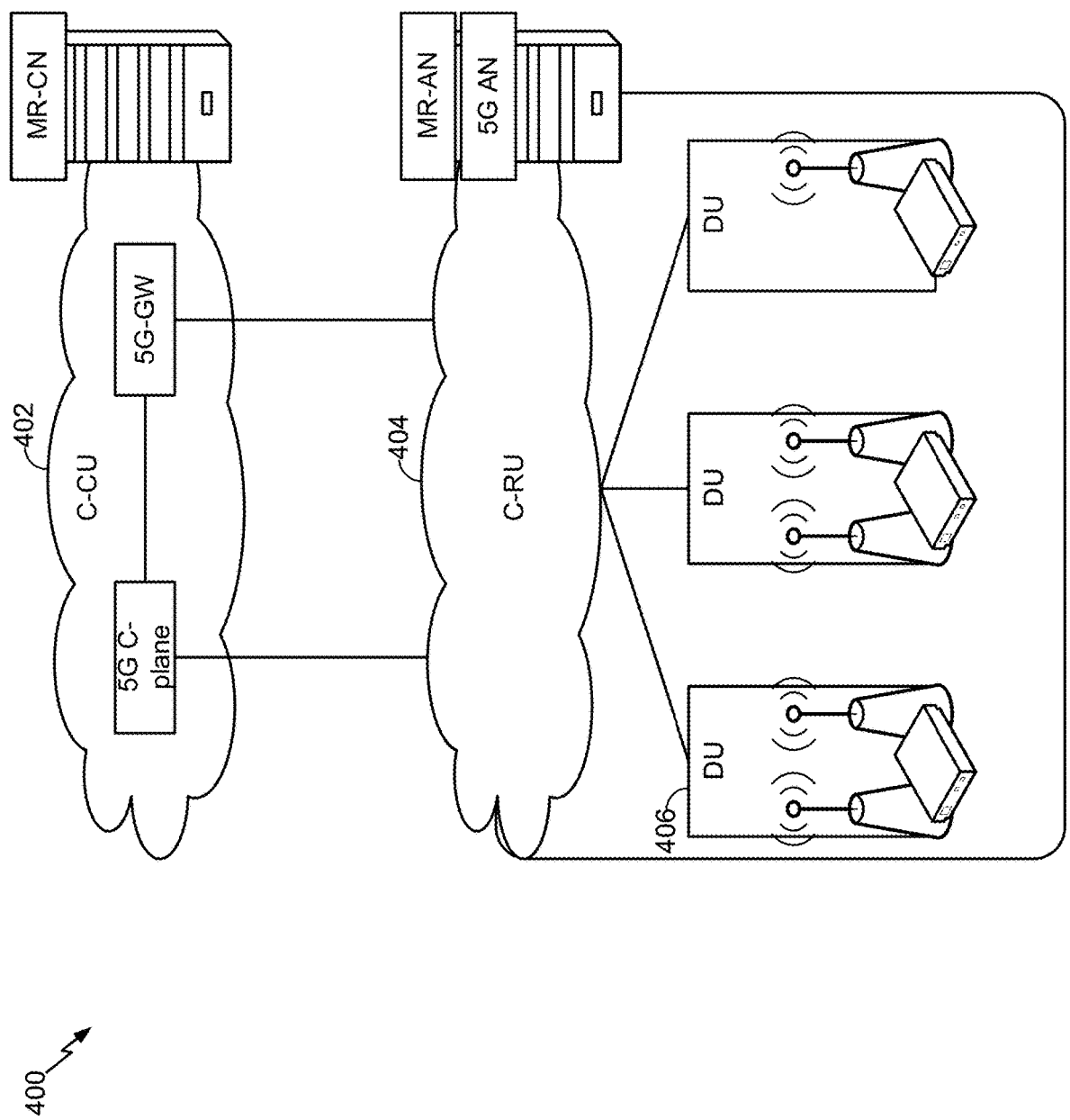
FIG. 4 is a diagram illustrating an example physical architecture of a distributed RAN.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity.

A centralized RAN unit (C-RU) 404 may host one or more ANC functions. Optionally, the C-RU may host core network functions locally. The C-RU may have distributed deployment. The C-RU may be closer to the network edge.

A distributed unit (DU) 406 may host one or more TRPs. The DU 406 may be located at edges of the network with radio frequency (RF) functionality. In some aspects, a DU 406 (hosting one or more TRPs 308) may determine a phase rotation for a received symbol, associated with a one-tone uplink transmission from a UE, based at least in part on a tone index of a tone associated with the received symbol (e.g., when the UE that transmits the uplink communication is allocated resources at a sub-PRB granularity and uses two tone modulation), as described herein. In some aspects, a UE may generate (e.g., based at least in part on one or more sequences) and provide, to a DU 406, a one-tone DMRS (e.g., when the UE is allocated resources at a sub-PRB granularity and uses two tone modulation), as described herein.

As indicated above, FIG. 4 is provided merely as an example. Other examples may differ from what is described with regard to FIG. 4.

Generally, a minimum allocation granularity for an uplink communication (e.g., a PUSCH communication transmitted by an enhanced machine-type communication (eMTC) UE) is one physical resource block (PRB). However, allocations at such a minimum granularity may be inefficient (e.g., since a UE is power limited even with a one PRB allocation in, for example, a deep coverage scenario). Thus, reducing the minimum granularity of a resource allocation to be less than one PRB may improve uplink spectrum efficiency by allowing additional UEs to be multiplexed in the PRBs using frequency division multiplexing. A resource allocation at a granularity that is less than one PRB is herein referred to as a resource allocation at a sub-PRB granularity.

One technique for supporting resource allocations at sub-PRB granularity (e.g., for eMTC UEs) is to implement resource allocations of three subcarriers (e.g., three adjacent subcarriers) with SC-FDMA π/2 binary phase shift keying (BPSK) modulation, where only two of the three subcarriers are used by a UE for transmitting an uplink communication. This technique has the benefit of providing a relatively low peak to average power ratio (PAPR) since, with DFT spreading of length two, this causes the UE to transmit using a single tone (i.e., a single allocated subcarrier). For example, assuming that a and b are BPSK modulated symbols. After DFT spreading, the symbols for mapping on the two tones are (a+b) or (a−b). Due to the use of BPSK, one of these two symbols is zero (i.e., transmitted only on one tone). In such a case, input bits (e.g., bits of uplink data) may be mapped to the subcarriers using the following table:

| b0b1 | Modulated symbol | Used tone index |
|------|------------------|-----------------|
| 00 | $\frac{1}{\sqrt{2}}(1+j)$ | k0 |
| 01 | $\frac{1}{\sqrt{2}}(1+j)$ | k1 |
| 10 | $\frac{1}{\sqrt{2}}(1+j)$ | k1 |
| 11 | $\frac{-1}{\sqrt{2}}(1+j)$ | k0 | where k0 and k1 represent the first tone index and the second tone index, respectively, of the two adjacent tones to be used. Notably, the above table is provided for illustrative purposes, and other mapping schemes may be used.

When transmitting a demodulation reference signal (DMRS) associated with such a transmission of uplink data, a one-tone DMRS (i.e., a DMRS that uses a single subcarrier) may be desirable in order to, for example, keep a PAPR, associated with the DMRS, reasonably close to the PAPR associated with the data transmission.

Some techniques and apparatuses, described herein, provide for generation of a one-tone DMRS based at least in part on one or more sequences. The one-tone DMRS may be generated and transmitted by a UE when the UE is allocated resources at a sub-PRB granularity and uses two tone modulation, as described above.

FIGS. 5A-5E are diagrams associated with an example 500 of generating a one-tone DMRS for a sub-PRB allocation with two tone modulation.

Figure 5A:
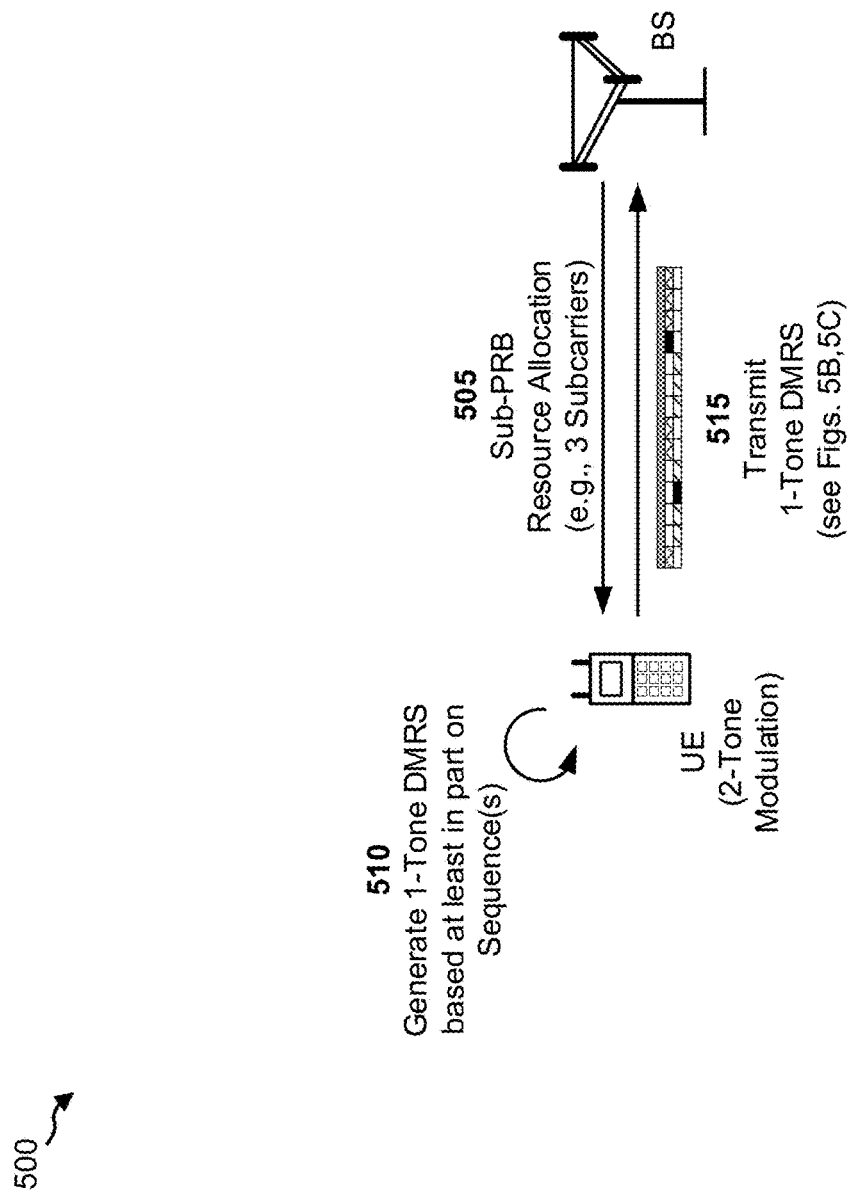

At 505, a UE (e.g., a UE 120) may receive a resource allocation that identifies a plurality of subcarriers at a sub-PRB granularity (e.g., three subcarriers) on which the UE may transmit an uplink communication. In some aspects, the UE may be configured to use a two-tone modulation scheme (e.g., using π/2 BPSK modulation) to transmit on at least two of the plurality of subcarriers when transmitting uplink data or a one-tone DMRS, as described above. In some aspects, the UE may receive the resource allocation from a base station (e.g., base station 110), as shown in FIG. 5A. For the purposes of example 500, the UE processes the uplink data for transmission in the manner described above (e.g., such that the two-tone modulation scheme results in each symbol being transmitted on a single tone). In some aspects, the resource allocation may serve as an indication that the UE is to generate the one-tone DMRS (e.g., since the UE needs to transmit the one-tone DMRS when sending uplink communications using the two-tone modulation scheme).

At 510, the UE may generate the one-tone DMRS based at least in part on one or more sequences. In some aspects, the one or more sequences may include a first sequence and a second sequence, and the UE may generate the one-tone DMRS based at least in part on a composite of the first sequence and the second sequence. In such a case, the first sequence may be associated with selecting a modulation symbol (e.g., a BPSK symbol), and the second sequence may be associated with selecting a tone (i.e., a subcarrier), of the at least two tones, to be used to transmit the one-tone DMRS. In some aspects, the first sequence may be, for example, a linear cyclic code, a Hadamard code, a Gold sequence, and/or the like, and the second sequence may be, for example, a Gold sequence. In some aspects, the second sequence may be independent of an identity of a cell associated with the UE (e.g., the Gold sequence may be common among different cells). In some aspects, a relatively large number of DMRS sequences can be generated by selecting different codewords of a linear cyclic code for randomizing interference between different cells. For example, a (16,6) linear cyclic code with the generator polynomial $1+D^2+D^8+D^{10}$ can be used, and 30 codewords can be selected to generate 30 DMRS sequences, each with length 16. In some aspects, the selection of the codewords can provide low cross-correlation between sequences in order to minimize an impact of inter-cell interference.

Additionally, or alternatively, the first sequence may be one of N complex orthogonal sequences, and the second sequence may be one of two binary orthogonal sequences (where N is a number of symbols associated with the one-tone DMRS). For example, in some aspects, the first sequence may be a Hadamard code (e.g., defined by $r(n)=1/\sqrt{2}(1+j)w$ (n mod 16) where w(n) is a Hadamard code with length 16) and the second sequence may be a binary sequence (e.g., 101010 . . . or 010101 . . . ). In some aspects, the binary orthogonal sequence may be used to determine the tone for transmitting the one-tone DMRS. For example, the value '0' may denote transmission on a particular tone of the two used tones, and the value '1' may denote transmission on the other tone of the two used tones. FIGS. 5B and 5C show examples of tone mapping based at least in part on binary sequences 101010 . . . and 010101 . . . , respectively.

In some aspects, when the one or more sequences include a first sequence and a second sequence, mapping of a symbol of the one-tone DMRS may be performed without performing BPSK modulation or DFT spreading (e.g., such that one-tone DMRS symbols are processed in a different manner than symbols associated with uplink data).

Figure 5D:
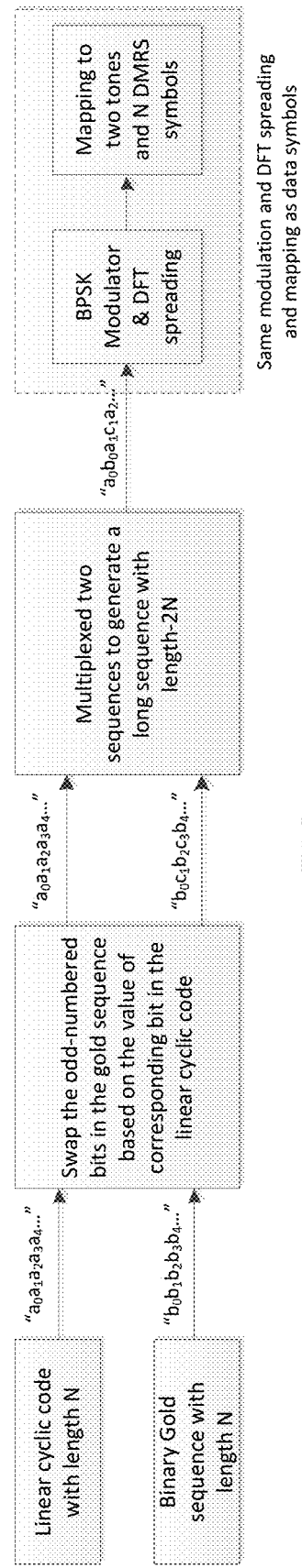

In some aspects, when the one or more sequences include a first sequence and a second sequence, the one-tone DMRS symbols may be processed based at least in part on performing BPSK modulation and DFT spreading associated with the first sequence and the second sequence (e.g., such that the one-tone DMRS symbols are processed in a similar manner as symbols associated with uplink data). FIG. 5D is a diagram illustrating example steps for processing one-tone DMRS symbols based at least in part on performing BPSK modulation and DFT spreading associated with an example first sequence (e.g., a linear cyclic code with length N) and an example second sequence (e.g., a binary Gold sequence with length N). As shown in FIG. 5D, in some aspects, BPSK modulation and DFT spreading can be performed based at least in part on swapping one or more bits in the second sequence (based at least in part on one or more corresponding values in the first sequence), and based at least in part on multiplexing the first sequence and the second sequence. As shown, BPSK modulation and DFT spreading may be performed after the swapping and multiplexing (e.g., using the same modulation and DFT spreading as that associated with processing uplink data symbols). In some aspects, the swapping operation may be needed since a tone index for mapping a one-tone DMRS symbol is determined based at least in part on values of two input bits (e.g., according to the data mapping table provided above). In some aspects, symbol mapping may be performed after BPSK modulation and DFT spreading, as shown in FIG. 5D.

Figure 5E:
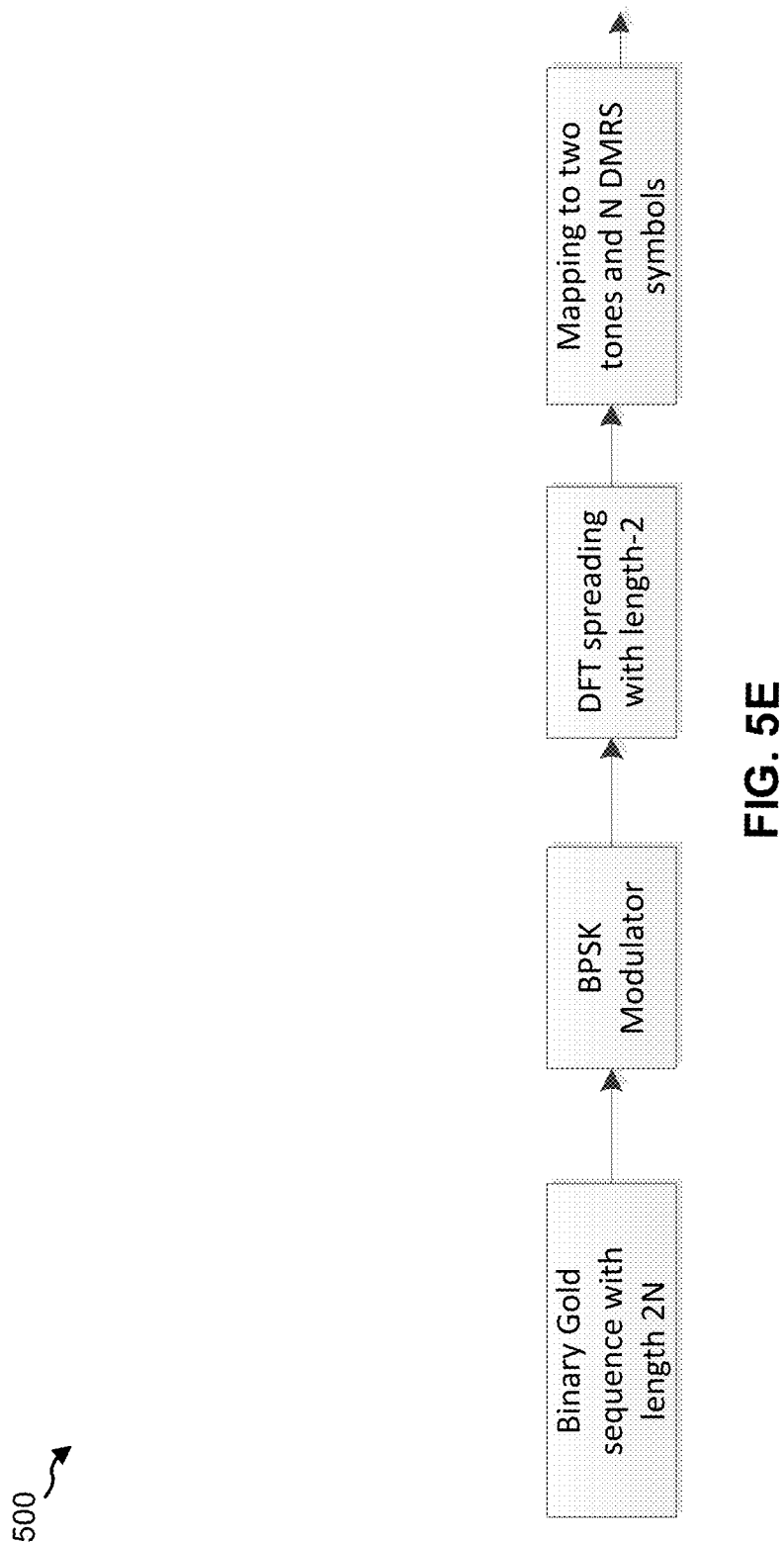

In some aspects, the one or more sequences may include a single binary sequence, and the one-tone DMRS may be generated based at least in part on performing BPSK modulation and DFT spreading on the single binary sequence. In some aspects, the single binary sequence may include, for example, a Gold sequence with a length 2N, where N is a number of symbols associated with the one-tone DMRS. As a particular example, a Gold sequence with length 16 "1011101001101110" comprises the value pairs of 10,11, 10,10,01,10,11, and 10. Here, if pairs of 10 and 11 are mapped to b=+j), and pairs of 00 and 01 are mapped to a=1/√2(1+j) (e.g., using the example mapping table provided above), then an 8 BPSK modulated symbol "bbbbabbb" is generated based on this sequence. Here, if symbols associated with values 00 or 11 are mapped to tone index k0, and symbols associated with values 01 or 10 are mapped to a tone with tone index k1, then the second and seventh DMRS symbols (e.g., both associated with values of 11) can be mapped to the first tone with tone index k0, and the other six DMRS symbols can be mapped to the second tone with tone index k1 (e.g., since the other symbols are associated with values of 10 and 01). FIG. 5E is a diagram illustrating example steps for processing one-tone DMRS symbols based at least in part on performing BPSK modulation and DFT spreading associated with an example single binary sequence (e.g., a binary gold sequence with length 2N). As shown in FIG. 5E, in some aspects, BPSK modulation and DFT spreading can be performed on the single binary sequence, after symbol mapping is performed.

At 515, the UE may transmit the one-tone DMRS. For example, the UE may transmit the one-tone DMRS based at least in part on generating the one-tone DMRS as described above (e.g., using the tone identified based at least in part on generating the one-tone DMRS).

As indicated above, FIGS. 5A-5E are provided as examples. Other examples may differ from what is described with respect to FIGS. 5A-5E.

Figure 6:
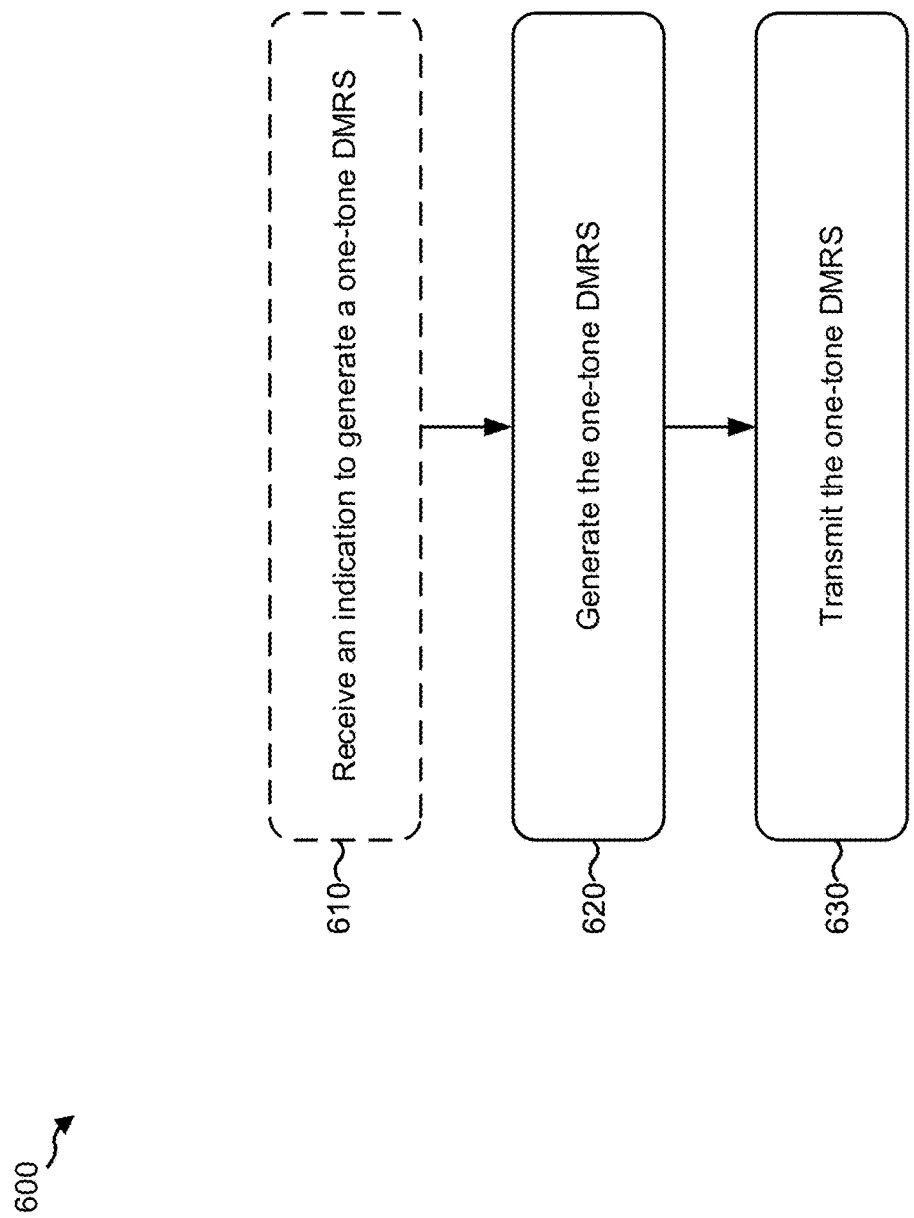
FIG. 6 is a flow chart of a method of wireless communication.

FIG. 6 is a flow chart of a method 600 of wireless communication. The method may be performed by a user equipment (e.g., the UE 120 of FIG. 1, the apparatus 702/702', and/or the like).

At 610, the UE may receive an indication to generate a one-tone DMRS. For example, the UE may receive (e.g., using antenna 252, DEMOD 254, MIMO detector 256, receive processor 258, controller/processor 280, and/or the like) a resource allocation that serves as an indication to generate a one-tone DMRS, as described above. In some aspects, the UE may transmit the one-tone DMRS based at least in part on a resource allocation at sub-PRB granularity and a two-tone modulation scheme, as described above.

At 620, the UE may generate the one-tone DMRS based at least in part on one or more sequences. For example, the UE may generate (e.g., using transmit processor 264, TX MIMO processor 266, controller/processor 280, and/or the like) the one-tone DMRS based at least in part on one or more sequences, as described above.

At 630, the UE may transmit the one-tone DMRS. For example, the UE may transmit (e.g., using antenna 252, modulator 253, TX MIMO processor 266, transmit processor 264, controller/processor 280, and/or the like) the one-tone DMRS, as described above. In some aspects, the UE may transmit the one-tone DMRS using a single tone associated with the resource allocation, as described above.

Method 600 may include additional aspects, such as any single aspect or any combination of aspects described below and/or in connection with one or more other methods or processes described elsewhere herein.

In some aspects, the two-tone modulation scheme uses π/2 BPSK modulation.

In some aspects, the single tone is one of three tones associated with the resource allocation.

In some aspects, the one or more sequences include a first sequence and a second sequence.

In some aspects, the one-tone demodulation reference signal is generated based at least in part on a composite of the first sequence and the second sequence.

In some aspects, the first sequence is associated with selecting a modulation symbol, and the second sequence is associated with selecting the single tone used to transmit the one-tone demodulation reference signal.

In some aspects, the first sequence is a linear cyclic code, a Hadamard code, or a Gold sequence, and the second sequence is a Gold sequence.

In some aspects, the second sequence is independent of an identity of a cell associated with the UE.

In some aspects, the first sequence is one of N complex orthogonal sequences, and the second sequence is one of two binary orthogonal sequences, wherein N is a number of symbols associated with the one-tone demodulation reference signal.

In some aspects, the first sequence is a Hadamard code and the second sequence is a binary sequence.

In some aspects, the one-tone demodulation reference signal is generated based at least in part on performing BPSK modulation and DFT spreading associated with the first sequence and the second sequence.

In some aspects, the BPSK modulation and DFT spreading are performed based at least in part on multiplexing the first sequence and the second sequence.

In some aspects, the BPSK modulation and DFT spreading are performed based at least in part on swapping one or more bits in the second sequence based at least in part on one or more corresponding values in the first sequence.

In some aspects, the one or more sequences includes a single binary sequence.

In some aspects, the single binary sequence is a Gold sequence with length 2N, wherein N is a number of symbols associated with the one-tone demodulation reference signal.

In some aspects, the one-tone demodulation reference signal is generated based at least in part on performing BPSK modulation and DFT spreading associated with the single binary sequence.

Although FIG. 6 shows example blocks of a method of wireless communication, in some aspects, the method may include additional blocks, fewer blocks, different blocks, or differently arranged blocks than those shown in FIG. 6. Additionally, or alternatively, two or more blocks shown in FIG. 6 may be performed in parallel.

Figure 7:
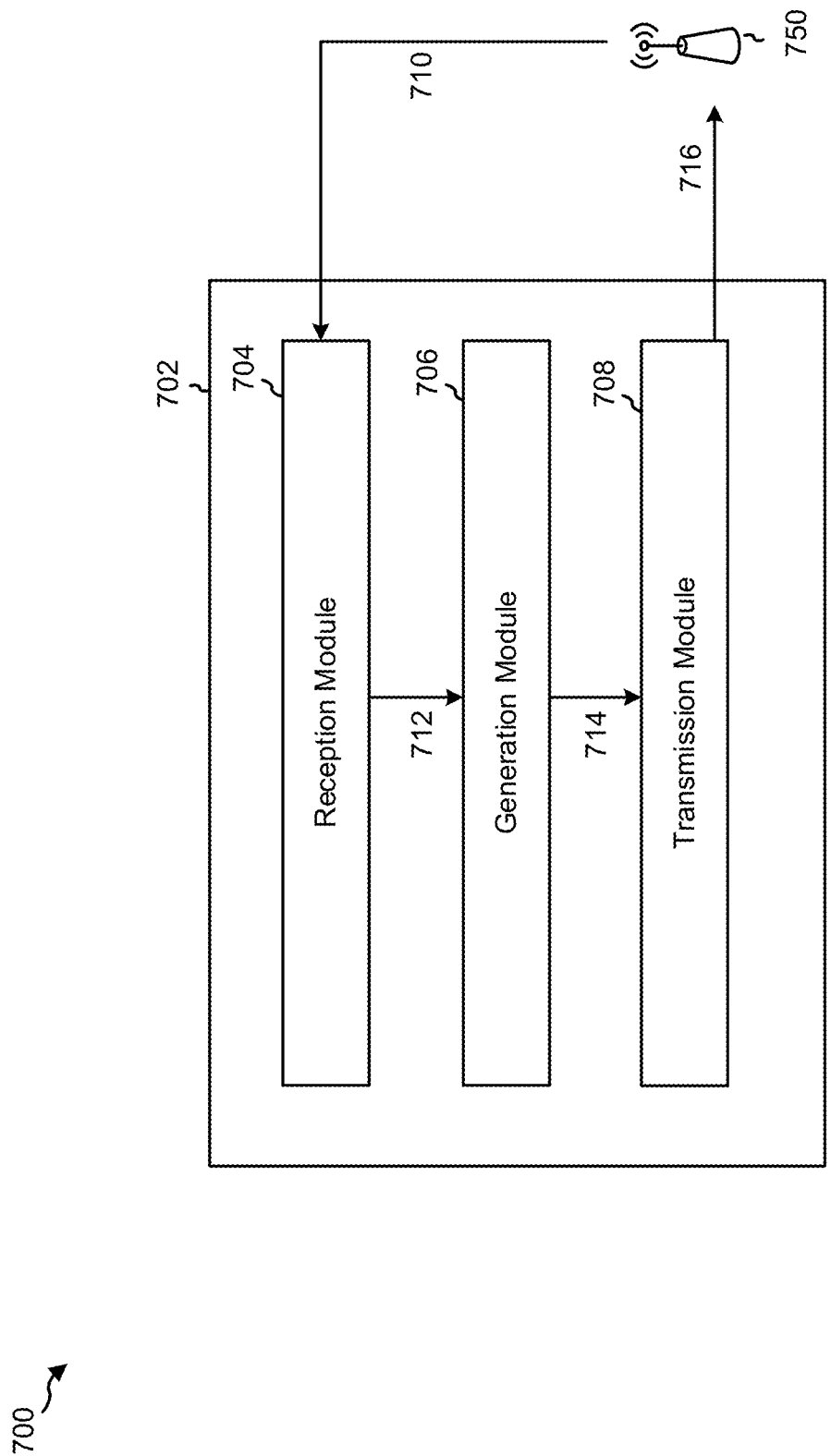
FIG. 7 is a conceptual data flow diagram illustrating the data flow between different modules/means/components in an example apparatus.

FIG. 7 is a conceptual data flow diagram 700 illustrating data flow between different modules/means/components in an example apparatus 702. The apparatus 702 may be a UE. In some aspects, the apparatus 702 includes a reception module 704, a generation module 706, and/or a transmission module 708.

The reception module 704 may receive, from base station 750 and as data 710, an indication to generate a one-tone DMRS. For example, a resource allocation at a sub-PRB granularity may serve as an indication that the UE is to generate a one-tone DMRS when the UE is configured to transmit uplink data using a two-tone modulation scheme, as described above.

The generation module 706 may receive, from the reception module 704 and as data 712, information associated with generating the one-tone DMRS (e.g., an indication to generate the one-tone DMRS). In some aspects, the generation module 706 may generate the one-tone DMRS. For example, the generation module 706 may generate the one-tone DMRS based at least in part on one or more sequences, as described above.

The transmission module 708 may receive, from the generation module 706 and as data 714, information associated with transmitting the one-tone DMRS to base station 750. In some aspects, the transmission module 708 may transmit the one-tone DMRS to base station 750 as data 716. For example, the transmission module 708 may transmit the one-tone DMRS to base station 750, as described above.

The apparatus may include additional modules that perform each of the blocks of the algorithm in the aforementioned method 600 of FIG. 6 and/or the like. As such, each block in the aforementioned method 600 of FIG. 6 and/or the like may be performed by a module, and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 7 are provided as an example. In practice, there may be additional modules, fewer modules, different modules, or differently arranged modules than those shown in FIG. 7. Furthermore, two or more modules shown in FIG. 7 may be implemented within a single module, or a single module shown in FIG. 7 may be implemented as multiple, distributed modules. Additionally, or alternatively, a set of modules (e.g., one or more modules) shown in FIG. 7 may perform one or more functions described as being performed by another set of modules shown in FIG. 7.

Figure 8:
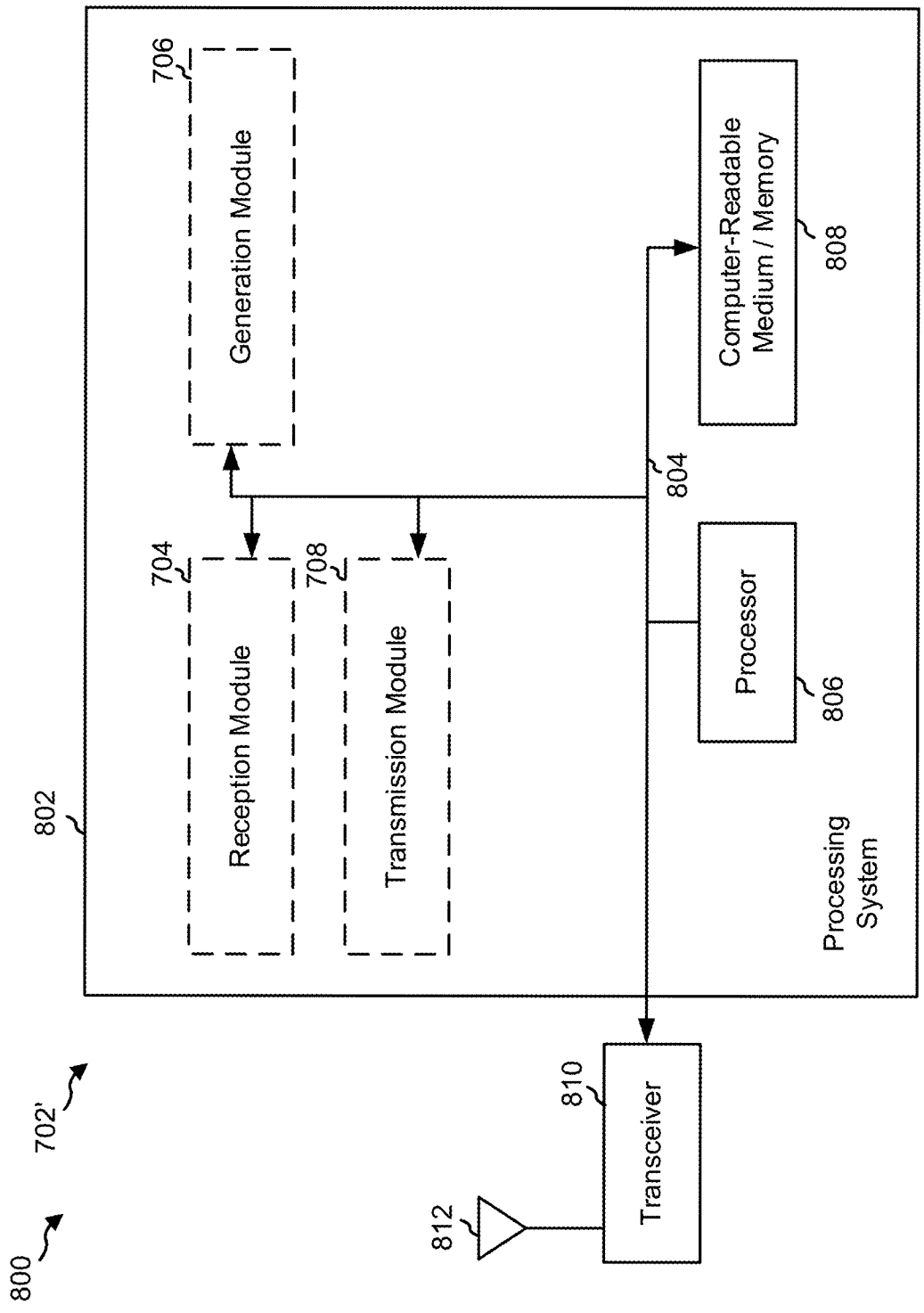
FIG. 8 is a diagram illustrating an example of a hardware implementation for an apparatus employing a processing system.

FIG. 8 is a diagram 800 illustrating an example of a hardware implementation for an apparatus 702' employing a processing system 802. The apparatus 702' may be a UE.

The processing system 802 may be implemented with a bus architecture, represented generally by the bus 804. The bus 804 may include any number of interconnecting buses and bridges depending on the specific application of the processing system 802 and the overall design constraints. The bus 804 links together various circuits including one or more processors and/or hardware modules, represented by the processor 806, the modules 704, 706, 708, and the computer-readable medium/memory 808. The bus 804 may also link various other circuits such as timing sources, peripherals, voltage regulators, and power management circuits, which are well known in the art, and therefore, will not be described any further.

The processing system 802 may be coupled to a transceiver 810. The transceiver 810 is coupled to one or more antennas 812. The transceiver 810 provides a means for communicating with various other apparatuses over a transmission medium. The transceiver 810 receives a signal from the one or more antennas 812, extracts information from the received signal, and provides the extracted information to the processing system 802, specifically the reception module 704. In addition, the transceiver 810 receives information from the processing system 802, specifically the transmission module 708, and based at least in part on the received information, generates a signal to be applied to the one or more antennas 812. The processing system 802 includes a processor 806 coupled to a computer-readable medium/memory 808. The processor 806 is responsible for general processing, including the execution of software stored on the computer-readable medium/memory 808. The software, when executed by the processor 806, causes the processing system 802 to perform the various functions described above for any particular apparatus. The computer-readable medium/memory 808 may also be used for storing data that is manipulated by the processor 806 when executing software. The processing system further includes at least one of the modules 704, 706, and 708. The modules may be software modules running in the processor 806, resident/stored in the computer readable medium/memory 808, one or more hardware modules coupled to the processor 806, or some combination thereof. The processing system 802 may be a component of the UE 120 and may include the memory 282 and/or at least one of the TX MIMO processor 266, the RX processor 258, and/or the controller/processor 280.

In some aspects, the apparatus 702/702' for wireless communication includes means for generating a one-tone demodulation reference signal based at least in part on one or more sequences, wherein the apparatus 702/702' is to transmit the one-tone DMRS based at least in part on a resource allocation at sub physical resource block granularity and a two-tone modulation scheme; means for transmitting the one-tone demodulation reference signal using a single tone associated with the resource allocation; and/or the like. The aforementioned means may be one or more of the aforementioned modules of the apparatus 702 and/or the processing system 802 of the apparatus 702' configured to perform the functions recited by the aforementioned means. As described above, the processing system 802 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions recited by the aforementioned means.

FIG. 8 is provided as an example. Other examples may differ from what is described in connection with FIG. 8.

When receiving symbols associated with a one-tone uplink communication (e.g., a symbol associated with a one-tone DMRS, a symbol associated with uplink data transmitted in one tone based at least in part on a two modulation scheme), a receiver (e.g., a base station) may need to compensate for a phase jump (e.g., caused by the presence of the cyclic prefix (CP)) between an end of a previous symbol and a start of a next symbol. For example, the base station may need to compensate for a phase jump between symbols such that a phase jump between a given pair of symbols is approximately equal to ±π/2 (e.g., when using π/2 BPSK modulation). Notably, the phase rotation is applied consecutively over each symbol, and the phase rotation at a given symbol is dependent on phase rotations of all previous symbols. In other words, the phase rotation is accumulated over the symbols.

For two-tone modulation using SC-FDMA π/2 BPSK, the tone index of a given symbol can differ from the tone index of a previous symbol (e.g., since a subcarrier used for a given symbol can differ from that used for a next symbol). Here, a phase rotation determined based at least in part on a tone index of the tone that is actually used for the one-tone communication may allow phase continuity to be maintained, but this may be unfeasible and/or undesirable for the base station to track. For example, since a phase rotation for a given symbol depends on the phase rotation for all the previous symbols, the receiver need to hypothesize $2^N$ hypotheses for N symbols, thereby increasing complexity at the base station (e.g., by requiring a trellis decoder to be configured on the base station).

Some techniques and apparatuses, described herein, provide for determination of a phase rotation for a symbol, associated with a one-tone uplink communication, based at least in part on a tone index. The phase rotation may be determined and applied by a wireless communication device (e.g., a base station, a UE) when the uplink communication uses resources allocated at a sub-PRB granularity and uses two tone modulation, as described above.

Figure 9:
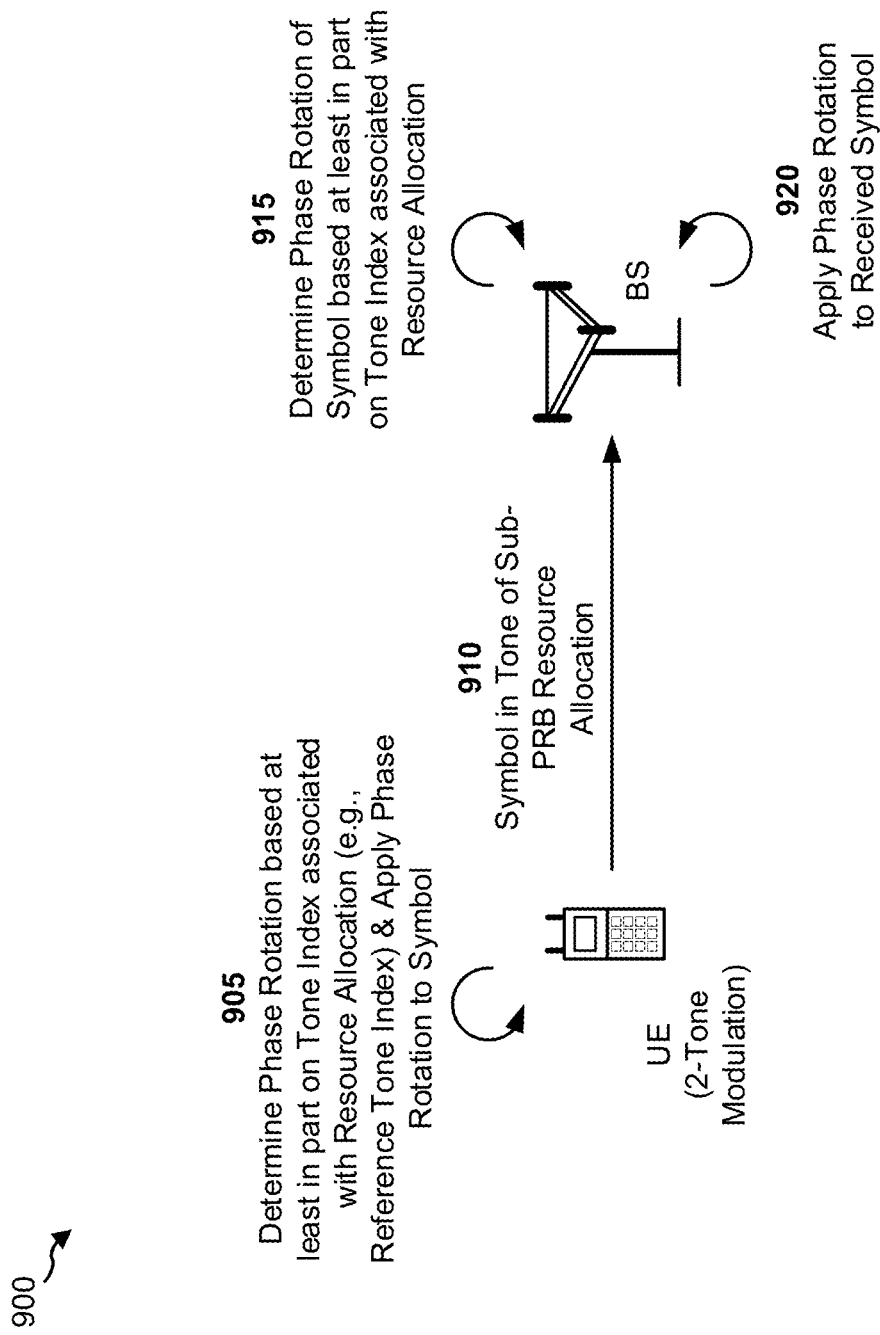
FIG. 9 is a diagram associated with an example of determining a phase rotation for a symbol of an uplink communication associated with a sub-PRB allocation with two tone modulation.

FIG. 9 is a diagram illustrating an example 900 of determining a phase rotation for a symbol of an uplink communication associated with a sub-PRB allocation that uses two tone modulation.

At 905, a UE (e.g., UE 120) may determine a phase rotation for a symbol associated with the uplink communication to be transmitted based at least in part on a sub-PRB resource allocation (e.g., three subcarriers) that uses two tone modulation. In some aspects, the UE may determine the phase rotation in a manner similar to that described below with regard to determination of the phase rotation by a base station (e.g., base station 110). For example, in some aspects, the UE may determine the phase rotation based at least in part on a tone index associated with the sub-PRB resource allocation, as described below. As shown, the UE may apply the phase rotation to the symbol, and may perform further processing associated with the symbol (e.g., modulation, encoding, and/or the like), after which the UE may transmit the symbol.

At 910, the base station may receive, from the UE, the symbol in the single tone associated with the sub-PRB resource allocation. For example, the base station may receive the symbol (e.g., associated with a one-tone DMRS, associated with uplink data) transmitted by the UE in a single tone when the UE uses a two tone modulation scheme (e.g., using π/2 BPSK modulation) for transmitting an uplink communication according to the sub-PRB allocation, as described above.

At 915, the base station may determine a phase rotation for the symbol associated with the uplink communication. In some aspects, the base station may determine the phase rotation based at least in part on a tone index of a tone associated with the symbol. In some aspects, the base station may determine the phase rotation based at least in part on a reference tone index associated with the resource allocation. In such a case, the reference tone index may be the same for multiple symbols (e.g., the reference tone may be the same for each symbol associated with the uplink communication).

In some aspects, the reference tone index may match a tone index of one of the tones associated with the resource allocation. For example, in a case where the UE is allocated three adjacent subcarriers, the reference tone index may be a tone index corresponding to one of the three tones. In such a case, the reference tone index may or may not be associated with a tone in which the symbol was received.

In some aspects, the reference tone index may be based at least in part on at least two tones associated with the resource allocation. For example, in a case where the UE is allocated three adjacent subcarriers, the reference tone index may be a tone index corresponding to a midpoint between two of the tones associated with the resource allocation. As a particular example, if a tone with tone index k1 and a tone with tone index k1+1 are used in association with transmitting based at least in part on the two tone modulation scheme, then the reference tone index may be k1+½ (i.e., a tone index associated with a tone halfway between k1 and k1+1).

In some aspects, the phase rotation cumulative term ($\varphi_k(l)$) (identifying the phase rotation for the received symbol) may be determined based at least in part on the following formula:

$$\varphi_k(\tilde{l}) = \begin{cases} 0 & \tilde{l} = 0 \\ \varphi_k(\tilde{l}-1) + 2\pi\Delta f(k+1/2)NT_s + 2\pi\Delta f(kref+1/2)N_{CP,l}T_s & \tilde{l} > 0 \end{cases}$$

As indicated, a first portion of the phase rotation may be determined based at least in part on an actual tone index k (e.g., a tone index associated with the tone in which the symbol is received), while a second portion of the phase rotation may be determined based at least in part on the reference tone index (represented as kref in the above formula). In this way, the phase rotation at each symbol may be known to the base station, and can be compensated from the received signal. Notably, the phase jump between two consecutive symbols may not be maintained as exactly ±π/2. For example, if the same tone k is selected for two contiguous symbols, then a phase jump will be $2\pi \times 0.5 \times N_{CP}/N \pm \pi/2$ when applying the phase rotation based at least in part on a reference tone index of k1+½.

In some aspects, the phase rotation may be determined based on a tone index associated with the tone in which the symbol is received. In such a case, the phase rotation may be periodically reset (e.g., at a start of a subframe, at a start of a slot, and/or the like).

At 920, the base station may apply the phase rotation to the symbol. For example, the base station may apply the phase rotation to the symbol, and may perform further processing associated with the symbol (e.g., demodulation, decoding, and/or the like).

As indicated above, FIG. 9 is provided as an example. Other examples may differ from what is described with respect to FIG. 9.

Figure 10:
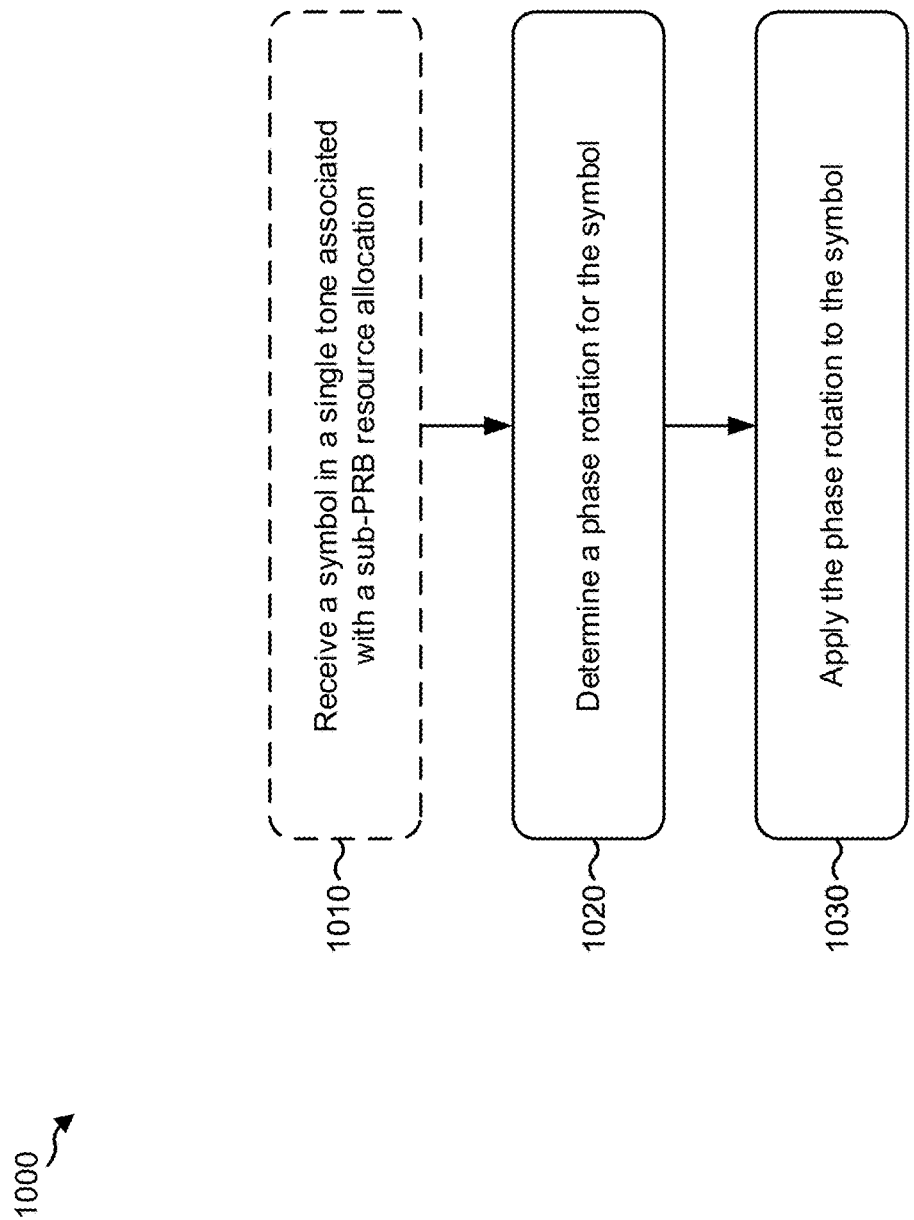
FIG. 10 is a flow chart of a method of wireless communication.

FIG. 10 is a flow chart of a method 1000 of wireless communication. The method may be performed by a base station (e.g., the BS 110 of FIG. 1, the apparatus 1102/1102', and/or the like).

At 1010, the base station may receive a symbol in a single tone associated with a sub-PRB resource allocation. For example, the base station may receive (e.g., using antenna 234, DEMOD 232, MIMO detector 236, receive processor 238, controller/processor 240, and/or the like) a symbol in a single tone associated with an uplink communication in a sub-PRB resource allocation, as described above. In some aspects, the UE uses a two-tone modulation scheme for transmitting the uplink communication, and is associated with a resource allocation at sub-PRB granularity, as described above.

At 1020, the base station may determine a phase rotation for the symbol. For example, the base station may determine (e.g., using DEMOD 232, MIMO detector 236, receive processor 238, controller/processor 240, and/or the like) a phase rotation for the symbol, as described above. In some aspects, the phase rotation is determined based at least in part on a tone index associated with the resource allocation, as described above.

At 1030, the base station may apply the phase rotation to the symbol. For example, the base station may apply (e.g., using DEMOD 232, MIMO detector 236, receive processor 238, controller/processor 240, and/or the like) the phase rotation to the symbol, as described above.

Method 1000 may include additional aspects, such as any single aspect or any combination of aspects described below and/or in connection with one or more other methods or processes described elsewhere herein.

In some aspects, the two-tone modulation scheme uses π/2 BPSK modulation.

In some aspects, the tone index is a reference tone index, associated with the resource allocation, wherein the reference tone index is the same for multiple symbols.

In some aspects, the reference tone index matches a tone index of one of three tones associated with the resource allocation.

In some aspects, the reference tone index is based at least in part on two tones associated with the resource allocation.

In some aspects, the reference tone index is based at least in part on a midpoint between the two tones associated with the resource allocation.

In some aspects, the tone index is a tone index of the tone in which the symbol is received.

In some aspects, the phase rotation is reset at a start of a subframe or a start of a slot.

Although FIG. 10 shows example blocks of a method of wireless communication, in some aspects the method may include additional blocks, fewer blocks, different blocks, or differently arranged blocks than those shown in FIG. 10. Additionally, or alternatively, two or more blocks shown in FIG. 10 may be performed in parallel.

Figure 11:
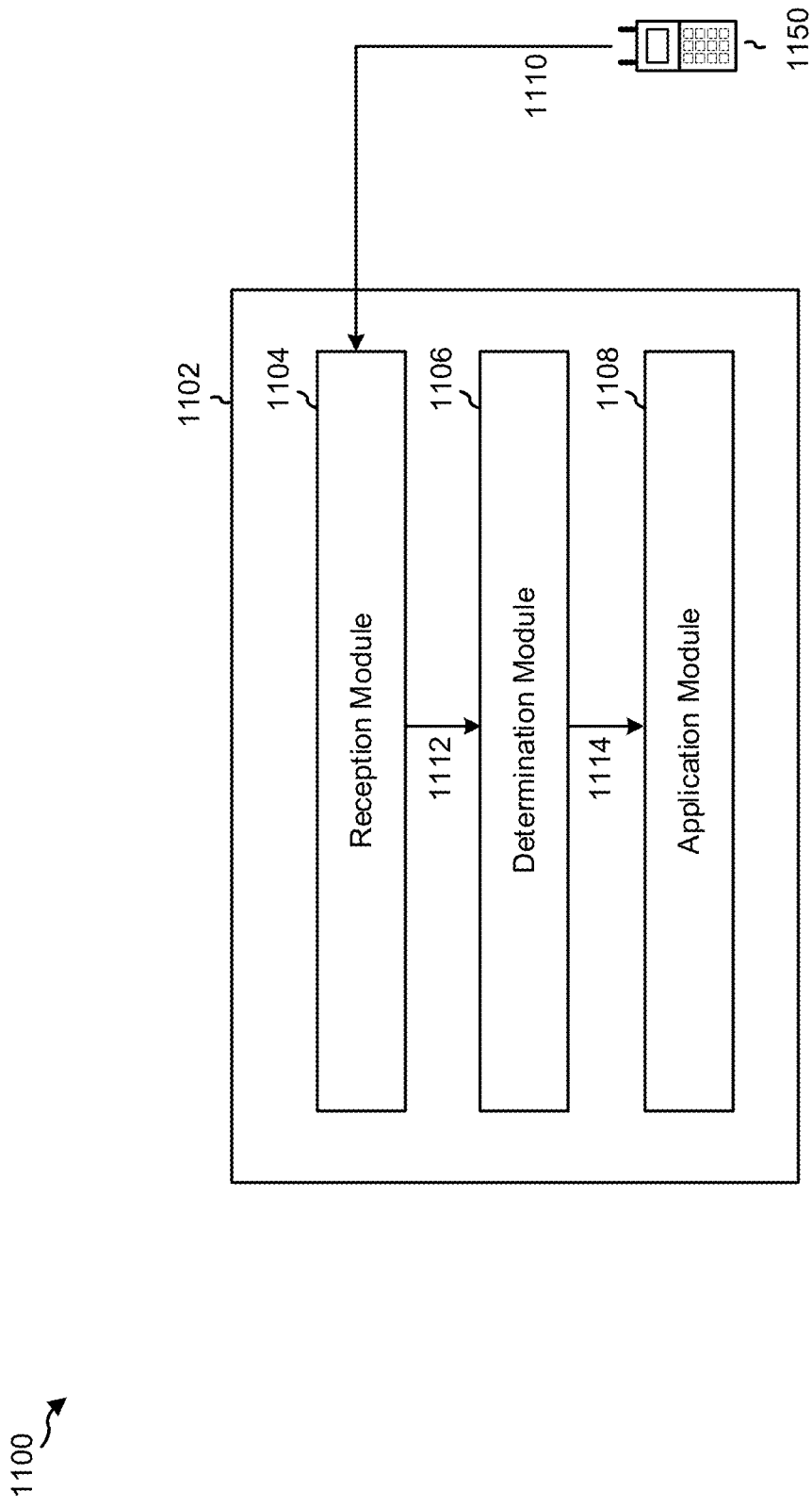
FIG. 11 is a conceptual data flow diagram illustrating the data flow between different modules/means/components in an example apparatus.

FIG. 11 is a conceptual data flow diagram 1100 illustrating data flow between different modules/means/components in an example apparatus 1102. The apparatus 1102 may be a base station. In some aspects, the apparatus 1102 includes a reception module 1104, a determination module 1106, and/or an application module 1108.

The reception module 1104 may receive, from UE 1150 and as data 1110, a symbol, associated with an uplink communication, in a single tone. For example, the base station may receive a symbol, associated with an uplink communication transmitted based at least in part on a resource allocation at a sub-PRB granularity, in a single tone when a UE that transmits the uplink communication is configured to transmit a one-tone DMRS and uplink data using a two-tone modulation scheme, as described above.

The determination module 1106 may receive, from the reception module 1104 and as data 1112, information associated with determining a phase rotation for the received symbol. In some aspects, the determination module 1106 may determine the phase rotation. For example, the determination module 1106 may determine the phase rotation, associated with the received symbol, based at least in part on a tone index of a tone associated with the received symbol, as described above.

The application module 1108 may receive, from the determination module 1106 and as data 1114, information associated with applying the phase rotation to the received symbol. In some aspects, the application module 1108 may apply the phase rotation to the received symbol. For example, the application module 1108 may apply the phase rotation to the received symbol such that further processing associated with the symbol (e.g., demodulation, decoding, and/or the like) can be performed, as described above.

The apparatus may include additional modules that perform each of the blocks of the algorithm in the aforementioned method 1000 of FIG. 10 and/or the like. Each block in the aforementioned method 1000 of FIG. 10 and/or the like may be performed by a module, and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 11 are provided as an example. In practice, there may be additional modules, fewer modules, different modules, or differently arranged modules than those shown in FIG. 11. Furthermore, two or more modules shown in FIG. 11 may be implemented within a single module, or a single module shown in FIG. 11 may be implemented as multiple, distributed modules. Additionally, or alternatively, a set of modules (e.g., one or more modules) shown in FIG. 11 may perform one or more functions described as being performed by another set of modules shown in FIG. 11.

Figure 12:
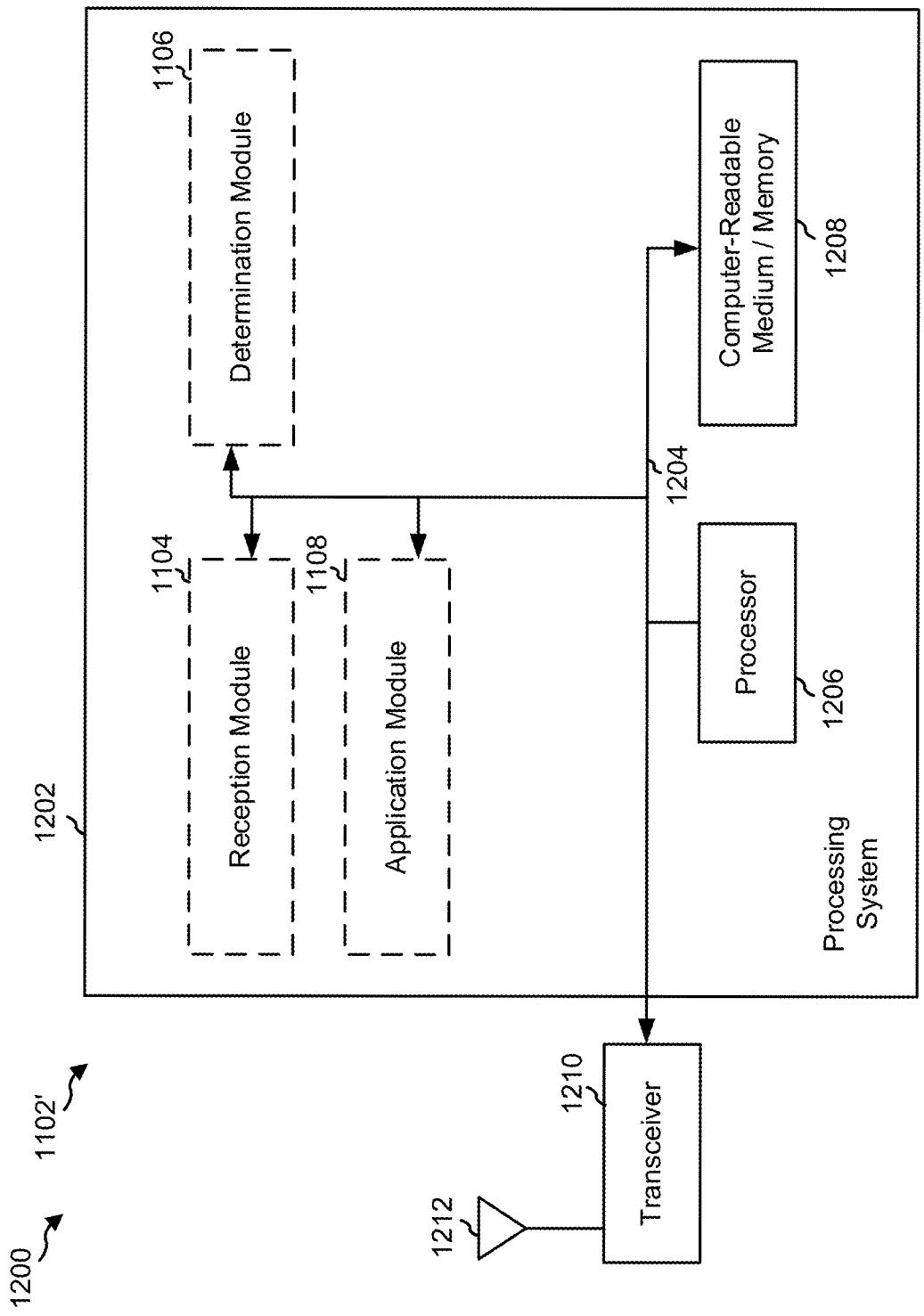
FIG. 12 is a diagram illustrating an example of a hardware implementation for an apparatus employing a processing system.

FIG. 12 is a diagram illustrating an example 1200 of a hardware implementation for an apparatus 1102' employing a processing system 1202. The apparatus 1102' may be a base station.

The processing system 1202 may be implemented with a bus architecture, represented generally by the bus 1204. The bus 1204 may include any number of interconnecting buses and bridges depending on the specific application of the processing system 1202 and the overall design constraints. The bus 1204 links together various circuits including one or more processors and/or hardware modules, represented by the processor 1206, the modules 1104, 1106, 1108, and the computer-readable medium/memory 1208. The bus 1204 may also link various other circuits such as timing sources, peripherals, voltage regulators, and power management circuits, which are well known in the art, and therefore, will not be described any further.

The processing system 1202 may be coupled to a transceiver 1210. The transceiver 1210 is coupled to one or more antennas 1212. The transceiver 1210 provides a means for communicating with various other apparatus over a transmission medium. The transceiver 1210 receives a signal from the one or more antennas 1212, extracts information from the received signal, and provides the extracted information to the processing system 1202, specifically the reception module 1104. In addition, the transceiver 1210 receives information from the processing system 1202, specifically a transmission module (not shown), and based at least in part on the received information, generates a signal to be applied to the one or more antennas 1212. The processing system 1202 includes a processor 1206 coupled to a computer-readable medium/memory 1208. The processor 1206 is responsible for general processing, including the execution of software stored on the computer-readable medium/memory 1208. The software, when executed by the processor 1206, causes the processing system 1202 to perform the various functions described above for any particular apparatus. The computer-readable medium/memory 1208 may also be used for storing data that is manipulated by the processor 1206 when executing software. The processing system further includes at least one of the modules 1104, 1106, and 1108. The modules may be software modules running in the processor 1206, resident/stored in the computer readable medium/memory 1208, one or more hardware modules coupled to the processor 1206, or some combination thereof. The processing system 1202 may be a component of the eNB 110 and may include the memory 242 and/or at least one of the TX MIMO processor 230, the RX processor 238, and/or the controller/processor 240.

In some aspects, the apparatus 1102/1102' for wireless communication includes means for determining a phase rotation for a received symbol associated with an uplink communication, wherein the uplink communication uses a two-tone modulation scheme and is associated with a resource allocation at sub physical resource block granularity, and wherein the phase rotation is determined based at least in part on a tone index of a tone associated with the received symbol; means for applying the phase rotation to the received symbol; and/or the like. The aforementioned means may be one or more of the aforementioned modules of the apparatus 1102 and/or the processing system 1202 of the apparatus 1102' configured to perform the functions recited by the aforementioned means. As described above, the processing system 1202 may include the TX MIMO processor 230, the receive processor 238, and/or the controller/processor 240. In one configuration, the aforementioned means may be the TX MIMO processor 230, the receive processor 2312, and/or the controller/processor 240 configured to perform the functions recited by the aforementioned means.

FIG. 12 is provided as an example. Other examples may differ from what is described in connection with FIG. 12.

Figure 13:
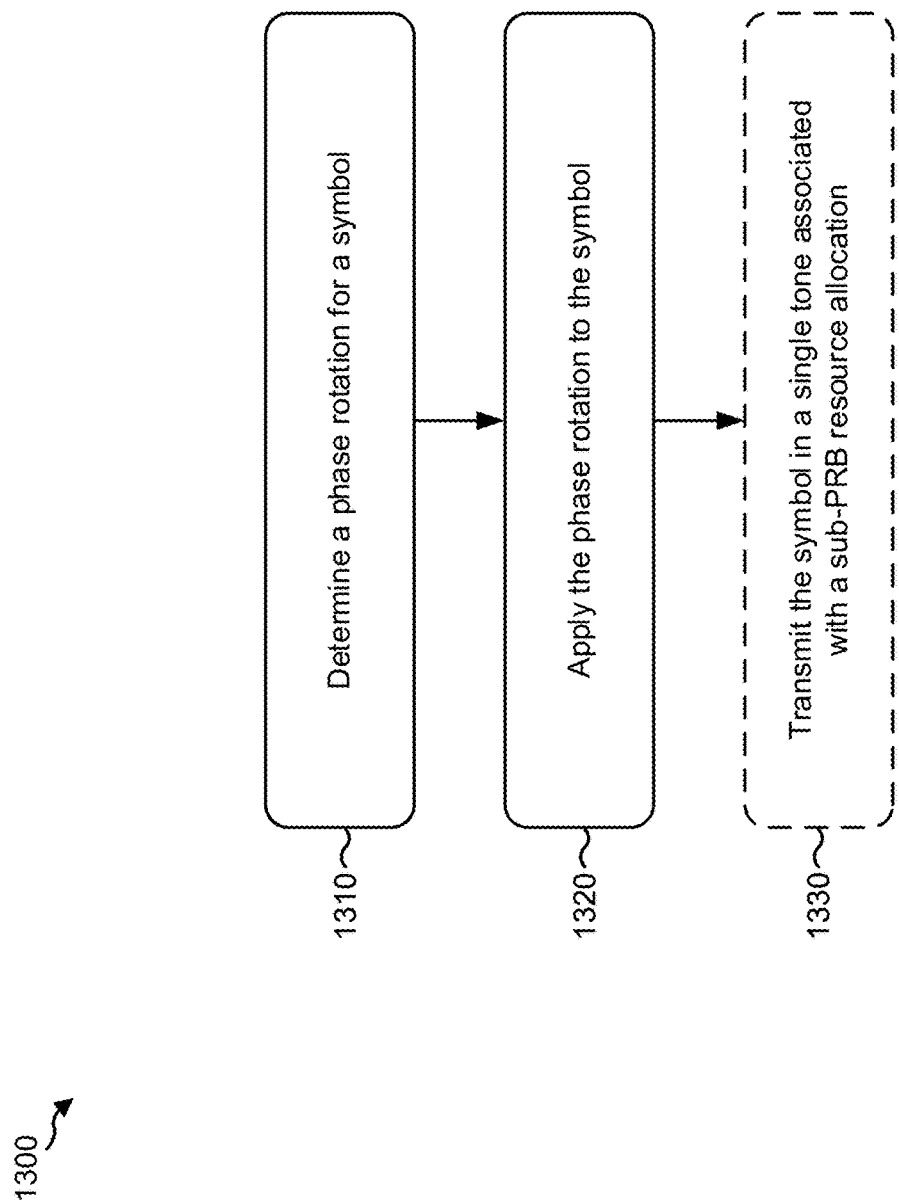
FIG. 13 is a flow chart of a method of wireless communication.

FIG. 13 is a flow chart of a method 1300 of wireless communication. The method may be performed by a UE (e.g., the UE 120 of FIG. 1, the apparatus 1402/1402', and/or the like).

At 1310, the UE may determine a phase rotation for a symbol. For example, the UE may determine (e.g., using MOD 254, TX MIMO processor 266, transmit processor 264, controller/processor 280, and/or the like) a phase rotation for the symbol, as described above. In some aspects, the phase rotation is determined based at least in part on a tone index associated with the resource allocation, as described above.

At 1320, the UE may apply the phase rotation to the symbol. For example, the UE may apply (e.g., using MOD 254, TX MIMO processor 266, transmit processor 264, controller/processor 280, and/or the like) the phase rotation to the symbol, as described above.

At 1330, the UE may transmit the symbol in a single tone associated with a sub-PRB resource allocation. For example, the UE may transmit (e.g., using antenna 252, MOD 254, TX MIMO processor 266, transmit processor 264, controller/processor 280, and/or the like) the symbol in a single tone associated with an uplink communication in a sub-PRB resource allocation, as described above. In some aspects, the UE uses a two-tone modulation scheme for transmitting the uplink communication, and is associated with a resource allocation at sub-PRB granularity, as described above.

Method 1300 may include additional aspects, such as any single aspect or any combination of aspects described below and/or in connection with one or more other methods or processes described elsewhere herein.

In some aspects, the two-tone modulation scheme uses $\pi/2$ BPSK modulation.

In some aspects, the tone index is a reference tone index, associated with the resource allocation, wherein the reference tone index is the same for multiple symbols.

In some aspects, the reference tone index matches a tone index of one of three tones associated with the resource allocation.

In some aspects, the reference tone index is based at least in part on two tones associated with the resource allocation.

In some aspects, the reference tone index is based at least in part on a midpoint between the two tones associated with the resource allocation.

In some aspects, the tone index is a tone index of the tone in which the symbol is transmitted.

In some aspects, the phase rotation is reset at a start of a subframe or a start of a slot.

Although FIG. 13 shows example blocks of a method of wireless communication, in some aspects the method may include additional blocks, fewer blocks, different blocks, or differently arranged blocks than those shown in FIG. 13. Additionally, or alternatively, two or more blocks shown in FIG. 13 may be performed in parallel.

Figure 14:
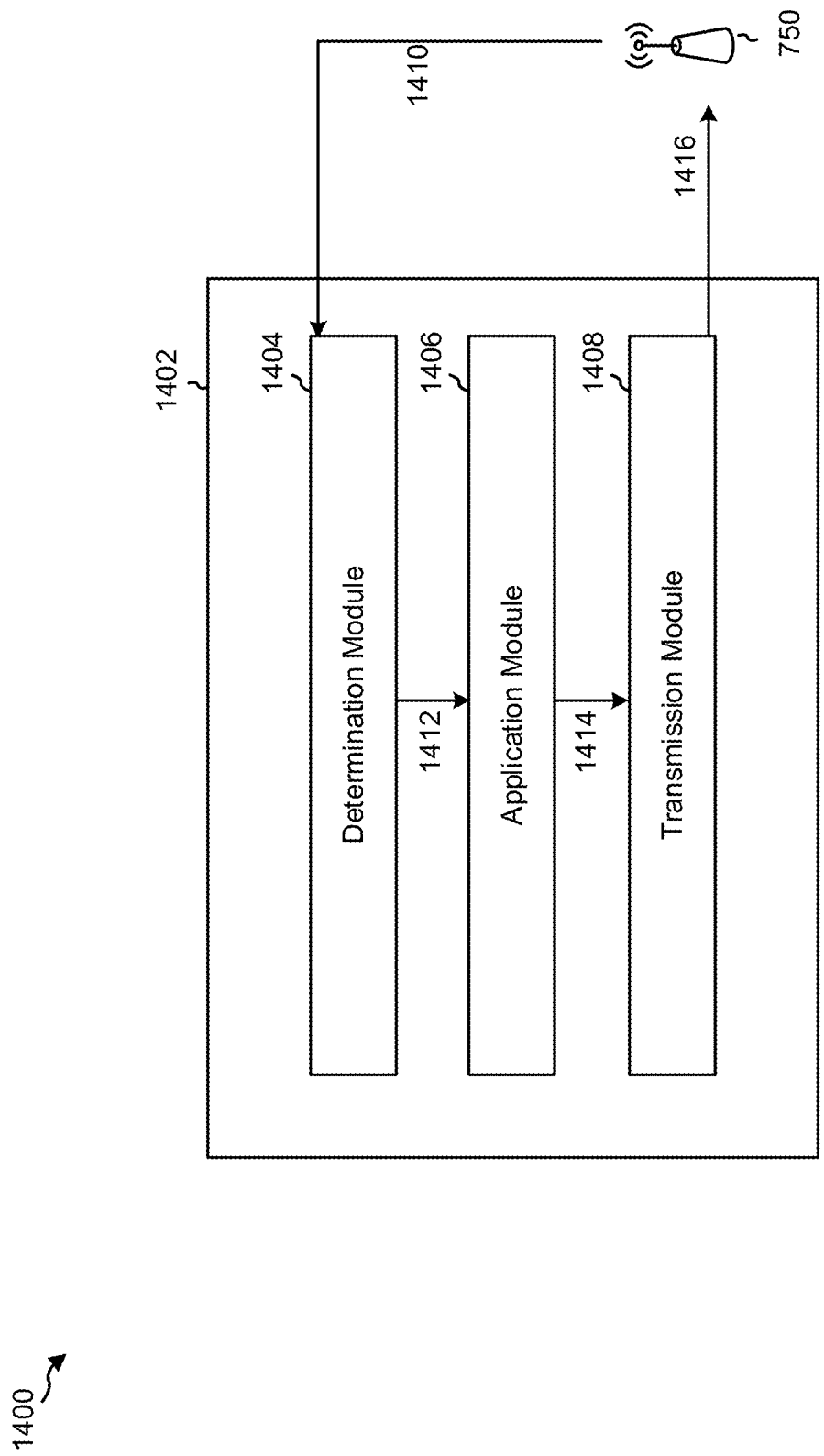
FIG. 14 is a conceptual data flow diagram illustrating the data flow between different modules/means/components in an example apparatus.

FIG. 14 is a conceptual data flow diagram 1400 illustrating data flow between different modules/means/components in an example apparatus 1402. The apparatus 1402 may be a UE. In some aspects, the apparatus 1402 includes a determination module 1404, an application module 1406, and/or a transmission module 1408.

The determination module 1404 may determine, based on received data 1410, a phase rotation for a symbol, as described herein. For example, the determination module 1404 may determine the phase rotation, associated with the symbol, based at least in part on a tone index associated with a sub-PRB resource allocation as described above.

The application module 1406 may receive, from the determination module 1404 and as data 1412, information associated with applying the phase rotation to the symbol. In some aspects, the application module 1406 may apply the phase rotation to the symbol. For example, the application module 1406 may apply the phase rotation to the received symbol such that further processing associated with the symbol (e.g., modulation, encoding, and/or the like) can be performed, as described above.

The transmission module 1408 may receive, from application module 1406 and as data 1414, information associated with the phase-rotated symbol, and may transmit the symbol associated with an uplink communication to be transmitted based at least in part on a resource allocation at a sub-PRB granularity, as described above.

The apparatus may include additional modules that perform each of the blocks of the algorithm in the aforementioned method 1300 of FIG. 13 and/or the like. As such, each block in the aforementioned method 1300 of FIG. 13 and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 14 are provided as an example. In practice, there may be additional modules, fewer modules, different modules, or differently arranged modules than those shown in FIG. 14. Furthermore, two or more modules shown in FIG. 14 may be implemented within a single module, or a single module shown in FIG. 14 may be implemented as multiple, distributed modules. Additionally, or alternatively, a set of modules (e.g., one or more modules) shown in FIG. 14 may perform one or more functions described as being performed by another set of modules shown in FIG. 14.

Figure 15:
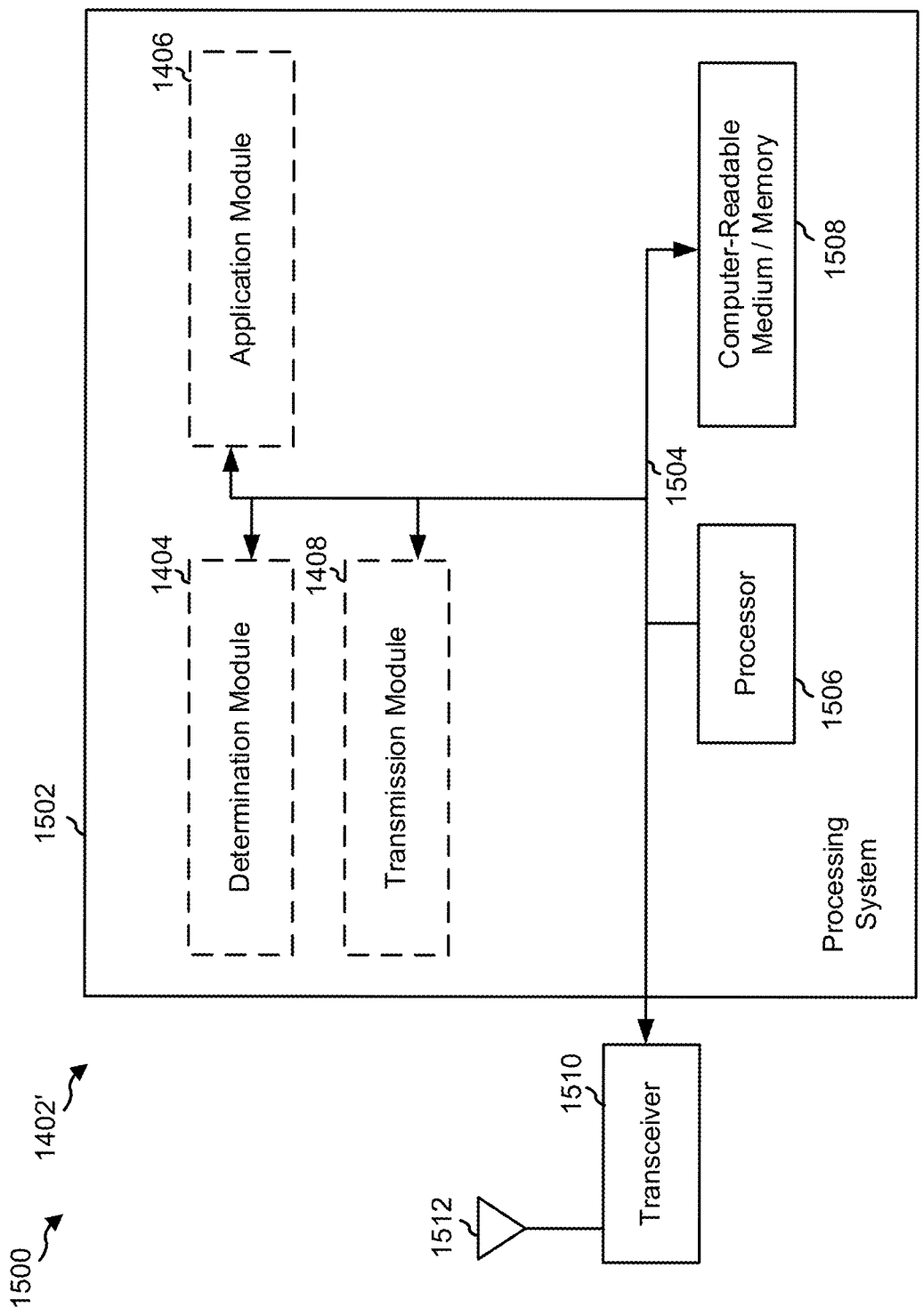
FIG. 15 is a diagram illustrating an example of a hardware implementation for an apparatus employing a processing system.

FIG. 15 is a diagram 1500 illustrating an example of a hardware implementation for an apparatus 1402' employing a processing system 1502. The apparatus 1402' may be a UE.

The processing system 1502 may be implemented with a bus architecture, represented generally by the bus 1504. The bus 1504 may include any number of interconnecting buses and bridges depending on the specific application of the processing system 1502 and the overall design constraints. The bus 1504 links together various circuits including one or more processors and/or hardware modules, represented by the processor 1506, the modules 1404, 1406, 1408, and the computer-readable medium/memory 1508. The bus 1504 may also link various other circuits such as timing sources, peripherals, voltage regulators, and power management circuits, which are well known in the art, and therefore, will not be described any further.

The processing system 1502 may be coupled to a transceiver 1510. The transceiver 1510 is coupled to one or more antennas 1512. The transceiver 1510 provides a means for communicating with various other apparatuses over a transmission medium. The transceiver 1510 receives a signal from the one or more antennas 1512, extracts information from the received signal, and provides the extracted information to the processing system 1502, specifically a reception module (not shown). In addition, the transceiver 1510 receives information from the processing system 1502, specifically the transmission module 1408, and based at least in part on the received information, generates a signal to be applied to the one or more antennas 1512. The processing system 1502 includes a processor 1506 coupled to a computer-readable medium/memory 1508. The processor 1506 is responsible for general processing, including the execution of software stored on the computer-readable medium/memory 1508. The software, when executed by the processor 1506, causes the processing system 1502 to perform the various functions described above for any particular apparatus. The computer-readable medium/memory 1508 may also be used for storing data that is manipulated by the processor 1506 when executing software. The processing system further includes at least one of the modules 1404, 1406, and 1408. The modules may be software modules running in the processor 1506, resident/stored in the computer readable medium/memory 1508, one or more hardware modules coupled to the processor 1506, or some combination thereof. The processing system 1502 may be a component of the UE 120 and may include the memory 282 and/or at least one of the TX MIMO processor 266, the TX processor 264, and/or the controller/processor 280.

In some aspects, the apparatus 1502/1402' for wireless communication includes means for determining a phase rotation for a received symbol associated with an uplink communication, wherein the uplink communication uses a two-tone modulation scheme and is associated with a resource allocation at sub physical resource block granularity, and wherein the phase rotation is determined based at least in part on a tone index associated with the resource allocation; means for applying the phase rotation to the received symbol; and/or the like. The aforementioned means may be one or more of the aforementioned modules of the apparatus 1402 and/or the processing system 1502 of the apparatus 1402' configured to perform the functions recited by the aforementioned means. As described above, the processing system 1502 may include the TX MIMO processor 266, the transmit processor 268, and/or the controller/processor 280. In one configuration, the aforementioned means may be the TX MIMO processor 266, the transmit processor 264, and/or the controller/processor 280 configured to perform the functions recited by the aforementioned means.

FIG. 15 is provided as an example. Other examples may differ from what is described in connection with FIG. 15.

It should be understood that the specific order or hierarchy of blocks in the processes/flow charts disclosed is an illustration of example approaches. Based upon design preferences, it should be understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
receiving, by a base station, a symbol in an uplink communication, wherein the uplink communication uses a two-tone modulation scheme and is in accordance with a resource allocation at sub physical resource block granularity,
    wherein the resource allocation includes resource allocations of three adjacent subcarriers where only two subcarriers of the three adjacent subcarriers are used for transmitting the uplink communication;
determining, by the base station, a phase rotation for the symbol in the uplink communication, wherein the phase rotation is determined based at least in part on a reference tone index associated with the resource allocation,
    wherein the reference tone index is the same for each symbol of the uplink communication; and
applying, by the base station, the phase rotation to the symbol.

2. The method of claim 1, wherein the two-tone modulation scheme uses π/2 binary phase shift keying (BPSK) modulation.

3. The method of claim 1, wherein the reference tone index matches a tone index of one of three tones associated with the resource allocation.

4. The method of claim 1, wherein the reference tone index is based at least in part on two tones associated with the resource allocation.

5. The method of claim 4, wherein the reference tone index is based at least in part on a midpoint between the two tones associated with the resource allocation.

6. The method of claim 1, wherein the phase rotation is further determined based on a tone index of a tone in which the symbol is received.

7. The method of claim 6, wherein the phase rotation is reset at a start of a subframe or a start of a slot.

8. The method of claim 1, wherein the reference tone index is based at least in part on a midpoint between two adjacent tone indexes associated with the resource allocation.

9. A method of wireless communication, comprising:
determining, by a user equipment, a phase rotation for a symbol associated with an uplink communication,
    wherein the uplink communication is to use a two-tone modulation scheme and is in accordance with a resource allocation at sub physical resource block granularity,
    wherein the resource allocation includes resource allocations of three adjacent subcarriers where only two subcarriers of the three adjacent subcarriers are used for transmitting the uplink communication,
    wherein the phase rotation is determined based at least in part on a reference tone index associated with the resource allocation, and
    wherein the reference tone index is the same for each symbol of the uplink communication;
applying, by the user equipment, the phase rotation to the symbol associated with the uplink communication; and
transmitting, by the user equipment, the symbol associated with the uplink communication.

10. The method of claim 9, wherein the two-tone modulation scheme uses π/2 binary phase shift keying (BPSK) modulation.

11. The method of claim 10, wherein the reference tone index matches a tone index of one of three tones associated with the resource allocation.

12. The method of claim 10, wherein the reference tone index is based at least in part on two tones associated with the resource allocation.

13. The method of claim 12, wherein the reference tone index is based at least in part on a midpoint between the two tones associated with the resource allocation.

14. The method of claim 9, wherein the phase rotation is further determined based on a tone index of a tone in which the symbol is to be transmitted.

15. The method of claim 14, wherein the phase rotation is reset at a start of a subframe or a start of a slot.

16. The method of claim 9, wherein the reference tone index is based at least in part on a midpoint between two adjacent tone indexes associated with the resource allocation.

17. A wireless communication device for wireless communication, comprising:
memory; and
    one or more processors coupled to the memory, the memory and the one or more processors configured to:

determine a phase rotation for a symbol associated with an uplink communication,
  wherein the uplink communication uses a two-tone modulation scheme and is in accordance with a resource allocation at sub physical resource block granularity,
  wherein the resource allocation includes resource allocations of three adjacent subcarriers where only two subcarriers of the three adjacent subcarriers are used for transmitting the uplink communication,
  wherein the phase rotation is determined based at least in part on a reference tone index associated with the resource allocation, and
  wherein the reference tone index is the same for each symbol of the uplink communication;
apply the phase rotation to the symbol associated with the uplink communication; and
transmit the symbol associated with the uplink communication.

18. The wireless communication device of claim 17, wherein the two-tone modulation scheme uses $\pi/2$ binary phase shift keying (BPSK) modulation.

19. The wireless communication device of claim 17, wherein the reference tone index matches a tone index of one of three tones associated with the resource allocation.

20. The wireless communication device of claim 17, wherein the reference tone index is based at least in part on two tones associated with the resource allocation.

21. The wireless communication device of claim 20, wherein the reference tone index is based at least in part on a midpoint between the two tones associated with the resource allocation.

22. The wireless communication device of claim 17, wherein the phase rotation is further determined based on a tone index of a tone in which the symbol is communicated.

23. The wireless communication device of claim 22, wherein the phase rotation is reset at a start of a subframe or a start of a slot.

24. A wireless communication device for wireless communication, comprising:
memory; and
one or more processors coupled to the memory, the memory and the one or more processors configured to:
  receive a symbol in an uplink communication, wherein the uplink communication uses a two-tone modulation scheme and is in accordance with a resource allocation at sub physical resource block granularity,
    wherein the resource allocation includes resource allocations of three adjacent subcarriers where only two subcarriers of the three adjacent subcarriers are used for transmitting the uplink communication;
  determine a phase rotation for the symbol in the uplink communication, wherein the phase rotation is determined based at least in part on a reference tone index associated with the resource allocation,
    wherein the reference tone index is the same for each symbol of the uplink communication; and
  apply the phase rotation to the symbol.

25. The wireless communication device of claim 24, wherein the two-tone modulation scheme uses $\pi/2$ binary phase shift keying (BPSK) modulation.

26. The wireless communication device of claim 24, wherein the reference tone index matches a tone index of one of three tones associated with the resource allocation.

27. The wireless communication device of claim 24, wherein the reference tone index is based at least in part on two tones associated with the resource allocation.

28. The wireless communication device of claim 27, wherein the reference tone index is based at least in part on a midpoint between the two tones associated with the resource allocation.

29. The wireless communication device of claim 24, wherein the phase rotation is further determined based on a tone index of a tone in which the symbol is received.

30. The wireless communication device of claim 29, wherein the phase rotation is reset at a start of a subframe or a start of a slot.

* * * * *